(12) United States Patent
Shishido et al.

(10) Patent No.: US 6,785,213 B2
(45) Date of Patent: Aug. 31, 2004

(54) DISK DRIVE APPARATUS, AND DISK FORMATTING METHOD

(75) Inventors: Yukio Shishido, Kanagawa (JP); Shigeki Tsukatani, Kanagawa (JP); Osamu Udagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 09/783,975

(22) Filed: Feb. 16, 2001

(65) Prior Publication Data

US 2002/0136137 A1 Sep. 26, 2002

(30) Foreign Application Priority Data

Feb. 18, 2000 (JP) .................................... P2000-046765

(51) Int. Cl.[7] .............................................. G11B 5/09
(52) U.S. Cl. .............................. 369/59.25; 369/124.08; 369/53.2
(58) Field of Search ........................... 369/59.25, 47.55, 369/53.37, 53.31, 32.01, 124.08, 124.07, 111, 53.2, 53.34, 47.32, 47.33, 47.19, 59.26, 30.18, 30.21, 30.26

(56) References Cited

U.S. PATENT DOCUMENTS 6,084,839 A * 7/2000 Sims, III .................. 369/59.25
6,473,380 B1 * 10/2002 Takahashi ................ 369/59.25

* cited by examiner

*Primary Examiner*—Thang V. Tran
(74) *Attorney, Agent, or Firm*—Oblon, Spivak, McClelland, Maier & Neustadt, P.C.

(57) ABSTRACT

Formatting is applied only to a local area which is a part of the entire recordable area of a rewritable disk and which does not include portions where a lead-in area and a lead-out area are to be formed. In other words, only the required minimum area is formatted. The formatted area is extended afterwards as required. Thus, disk formatting is shortened.

25 Claims, 23 Drawing Sheets

FIG. 8

| | DATA BITS | CHANNEL BITS |
|---|---|---|
| 0 | 00000000 | 01001000100000 |
| 1 | 00000001 | 10000100000000 |
| 2 | 00000010 | 10010000100000 |
| 3 | 00000011 | 10001000100000 |
| 4 | 00000100 | 01000100000000 |
| 5 | 00000101 | 00000100010000 |
| 6 | 00000110 | 00010000100000 |
| 7 | 00000111 | 00100100000000 |
| ⋮ | ⋮ | ⋮ |
| 255 | 11111111 | 00100000010010 |

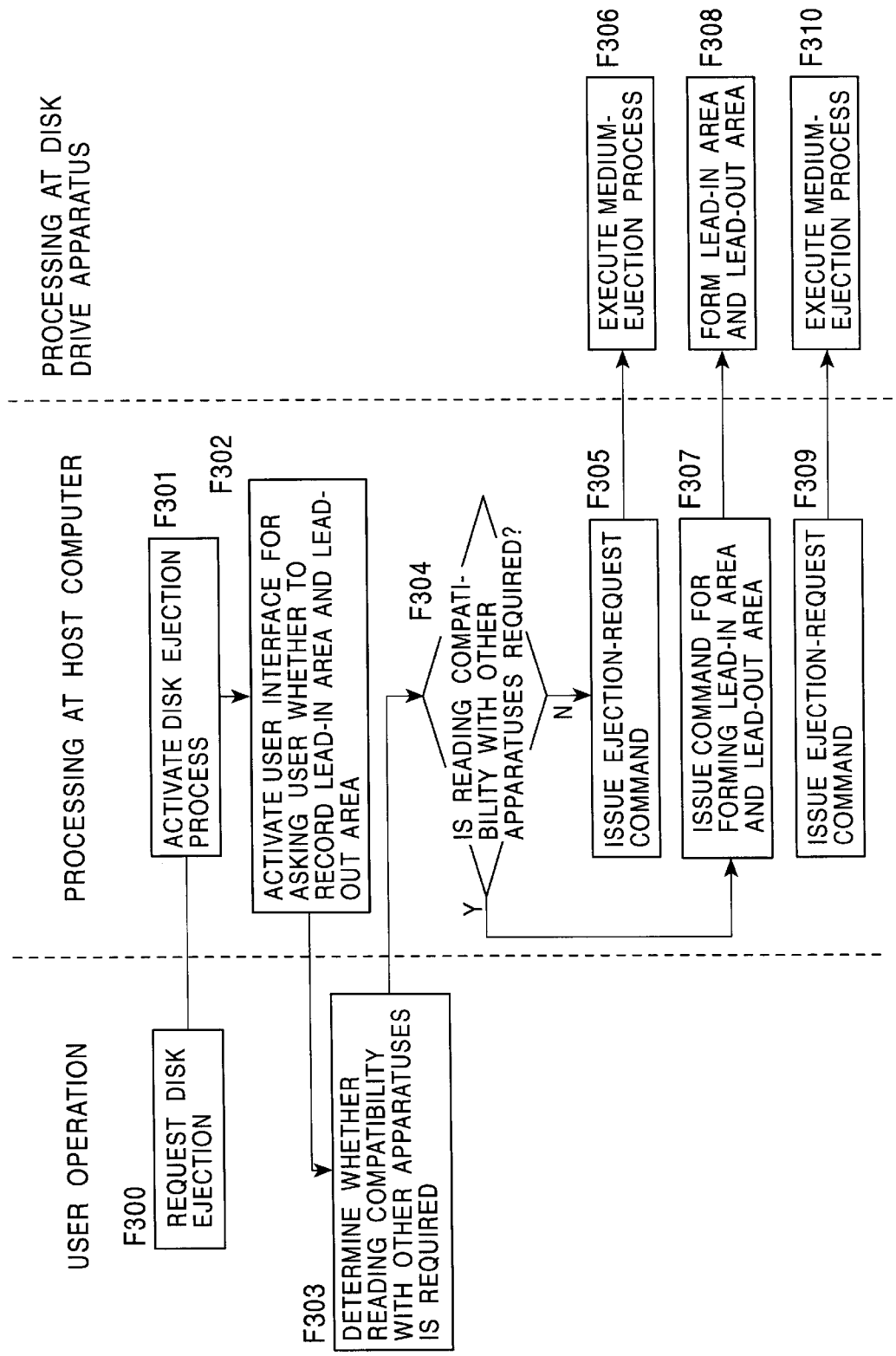

DISK DRIVE APPARATUS, AND DISK FORMATTING METHOD

BACKGROUND OF THE INVENTION

1. Field of the Invention

The present invention relates to disk drive apparatuses for recording and reproducing (reading) data into and from disks for which data is rewritable, such as compact discs rewritable (CD-RWs), and to disk formatting methods.

2. Description of the Related Art

Recording media for storing a large amount of data are usually formatted logically in units of addresses. Disk-shaped recording media and tape-shaped recording media used for computers, for example, usually have numbered sectors divided into several areas and numbered tracks.

These recording media usually have overhead information including additional error-detecting and error-correcting bits, synchronization patterns formed of bits used for synchronizing clocks before reading or writing, and an unused space for adapting to differing speeds among drives. The overhead information (including sector address numbers, synchronization patterns, and a gap of the unused space) is separately written in a process called formatting.

CD-type disks, generally called compact disks, have a single helical data track starting from the center (inner periphery) of the disk and ending at an end (outer periphery) of the disk. Recordable disks and rewritable disks, such as compact discs recordable (CD-Rs) and CD-RWs, have a helical data track formed of a physical groove. In contrast, reproduction-only (read-only) disks, such as compact discs digital audio (CD-DAs) and compact discs read-only memory (CD-ROMs), have no physical groove serving as a data track.

In a CD-type signal format, bytes of data are arranged in units of frames, frames of data are arranged in units of sectors, and sectors serve as the minimum addressable units.

One frame has 2,352 bytes of data. Frame addresses are indicated by a time and a frame offset. More specifically, frame addresses are expressed by {M, S, F}, where M indicates the minutes, S indicates the seconds, and F indicates the frame offset within one second. One second includes 75 frames.

These frame addresses (MSF addresses) may be absolute (measured from the beginning of the physical data track) or may be relative (measured from the beginning of the current logical data track).

Frames of data may be arranged in units of packets. One packet has one link frame, four run-in frames, an actual data frame, and two run-out frames.

CD-Rs have variable-length packets. CD-RWs have fixed-length packets in which a total of 39 frames (32 actual data frames and seven overhead frames) are included per packet in the current formatting standard.

In the format for CD-DAs and CD-ROMs, a so-called lead-in area disposed near the beginning of the physical data track and the following program area are required. The program area is formatted in units of logical data tracks. In the format of CD-DAs and CD-ROMs, a so-called lead-out area disposed at the end of the last logical data track is also required.

Reproducing (reading) apparatuses for CD-DAs and CD-ROMs can search for a particular logical-data-track number. For this search, the lead-in area includes TOC information (table-of-contents information) and the TOC information includes absolute MSF address information for logical data tracks. The lead-in area also includes a pointer pointing to the lead-out area.

In many drive apparatuses, since servo calibration cannot be achieved in the radial direction, data cannot be read from disks unless both the lead-in area and the lead-out area exist.

As described above, CD-Rs and CD-RWs have a physical groove in which data is recorded, but reproduction-only (read-only) disks (CD-DAs and CD-ROMs) have no physical groove. In the reproduction-only (read-only) disks, a helical path formed of data pits and lands serves as a track which can be optically detected.

In many reproduction (reading) apparatuses, the number of times a pickup crosses the track formed of a pit string on the disk or the number of times the pickup crosses the groove is counted during movement in the radial direction. Drive apparatuses for CD-Rs and CD-RWs have a groove detecting function, but drive apparatuses (reproduction-only (read-only) apparatuses) for CD-DAs and CD-ROMs may have no groove detecting function.

In some drive apparatuses, movement in the radial direction, which crosses a helical physical data track, may form an open loop, in which the number of times the physical data track is crossed is not increased.

Drive apparatuses which achieve an open-loop movement in the radial direction usually perform servo calibration in the radial direction by moving the pickup from the lead-in area to the lead-out area. Therefore, some drive apparatuses need to format all frames disposed between the lead-in area and the lead-out area.

After the format for CD-DAs and CD-ROMs had been developed, recordable (write-once) disks (CD-Rs) were introduced. CD-R recording has a very important feature of partially recording data into a disk and adding new data later. Since the original lead-in area cannot be changed in write-once disks when new data is added, this single lead-in area is insufficient. Therefore, a "session" technique was introduced, and the physical data track is formatted to have a plurality of sessions. In this case, each session has one lead-in area and one lead-out area. Up to 99 logical data tracks can be formed over all sessions. Each lead-in area except that for the last session includes a pointer pointing to the frame address of the next (possible) session.

The format for CD-ROMs and other formats can currently have a multi-session function for formatting the physical data track to have a plurality of sessions.

After that, rewritable (erasable) disks (CD-RWs) were developed. Like magnetic disks and tape, CD-RWs need generalized random-access recording. It is also necessary to maintain lower compatibility with single-session disks (such as CD-DAs) and multi-session disks. For tape and magnetic disks, special-format magnetic heads can be manufactured in order to format the tape and magnetic disks to have many data tracks at the same time at a higher speed than the usual track speed. For CD-RWs, however, heating and a certain cooling speed are required to write each pit, and the speed is essentially low. Rewritable media use a transparent, phase-change material which can change its crystalline state reversibly when heated and then cooled at a certain controlled speed. To heat the material and then cool small areas at a certain required controlled speed, a laser is used. Therefore, it takes 40 to 80 minutes to format the entire CD-RW disk irrespective of whether formatting is performed by the medium manufacturer or in a drive. As a result, formatted CD-RWs may be very expensive for users.

When the user needs to record data immediately, however, it may not be commercially acceptable that the drive apparatus of the user requires a period of 40 to 80 minutes for formatting a disk. Therefore, it is generally required that drive apparatuses partially format CD-RWs at a high speed in order to provide the usability of giving an initial state at a high speed and incremental recording of recording additional data.

As data recording methods for optical disks, such as write-once disks (CD-Rs) in which data is recordable, and rewritable disks (CD-RWs) into which data is again recordable in an overwriting manner, a track-at-once method and a packet-write method are used.

In the track-at-once method, data is recorded in a track at a time with one packet. User data blocks are continuous in the track, and a link block is not disposed between user data blocks. This track serves as a recording unit. Up to 99 tracks can be formed on a disk. Table-of-contents information (TOC), such as the starting address and the ending address of a track, is stored in an area different from that for recording user data.

In contrast, a track is divided into a plurality of packets, and data is recorded in units of packets in the packet-write method. Since data is recorded in units of packets, user data blocks are disposed in a discrete manner in one track and a link block is disposed between user data blocks.

The packet-write method includes two types, a fixed-length packet-write method and a variable-length packet-write method.

In the fixed-length packet-write method, a packet length indicating the number of user-data blocks in a packet is fixed in one track. In the variable-length packet-write method, packets having different packet lengths are disposed in one track. A universal disk format (UDF) is a file system using this fixed-length packet-write method. The UDF is used for various types of devices and is a file system using a recording format suited to the features of each device.

Since data is recorded additionally into CD-Rs, drive apparatuses only for CD-Rs just record data after recorded packets, even in recording in the packet-write method. Therefore, only additional writing is achieved by a so-called sequential UDF, which is a variable-length packet-write method. Formatting does not need to be taken into account.

In contrast, since data is overwritten in CD-RWs, drive apparatuses which can handle CD-RWs employ a random UDF, which records data in units of packets and reproduces (reads) data in units of blocks. In the random UDF, to allow data to be recorded and to be reproduced (read) at random, it is necessary to achieve formatting in which fixed-length packets are recorded in advance on the entire surface of a recording area or a specified area in a CD-RW to fill the recording area with fixed-length packets. This formatting allows data to be recorded and to be reproduced at random in the recording area of the CD-RW.

Formatting should be generally finished before variable data (such as user data) is written. Formatting takes much time in many cases. Therefore, recording media, such as flexible disks and tapes, are formatted in advance by manufacturers in some cases.

In other cases, formatting is achieved by apparatuses at the user side, such as disk drive apparatuses. When formatting is achieved at the user side, it is preferable that it does not take a long period of time to achieve formatting.

CD-RWs, which are rewritable disk recording media, are formatted in disk drive apparatuses at the user side in many cases.

A conventional example formatting operation for a CD-RW executed by a disk drive apparatus will be described below by referring to FIG. 1, FIG. 2, and FIG. 3.

FIG. 1 shows a formatting operation procedure achieved conventionally. This formatting operation is called a "full-formatting process" for simplicity of description. FIG. 2 and FIG. 3 show a formatting operation procedure shorter than the "full-formatting process" and it is called a "UDF-grow-formatting process" for simplicity.

The full-formatting process shown in FIG. 1 will be described below.

The entire disk area indicated in the figure means the entire area in which recording and reproduction (reading) are possible and which can be formatted in a CD-RW. The entire disk area does not include a power calibration area used for adjusting laser power or an intermediate recording area for recording intermediate management information obtained during a recording operation. (These areas, described later, are formed closer to the inner periphery of the disk than the lead-in area.)

In the full-formatting process, null data (=0) is written in the entire disk area in step ST1.

In the next step ST2, a lead-in area is formed at the innermost part of the disk and a lead-out area is formed at the outermost part in the entire disk area. The lead-in area stores management information generally called TOC (table of contents). The lead-out area indicates the end of the data recording area.

Then, in step ST3, the UDF file system is recorded immediately after the lead-in area and immediately before the lead-out area. The UDF (universal disk format) is an industry-admitted file system specification. System information is recorded according to the UDF specification.

In step ST4, verification is achieved for the area sandwiched by the lead-in area and the lead-out area, namely, a program area in which user data is recorded. The information recorded in the disk is read as verification data, and it is checked whether the correct data, namely, in this case, null data, is read. If incorrect verification data is read, it is determined that a portion (sector) which stores the data is defective, and a changing process is performed.

The changing process replaces the defective sector with a spare sector. Specifically, a sparing table for managing the defective sector and the new sector as a pair is updated.

The full-formatting process has been completed.

FIG. 2 and FIG. 3 show the UDF-grow-formatting process. This process indicates a formatting method called "growing," specified in the UDF.

In this case, null data (=0) is written in a portion of the entire disk area in step ST11.

In the next step ST12, a lead-in area is formed at the innermost part of the portion where null data has been written and a lead-out area is formed at the outermost part.

Then, in step ST13, the UDF file system is recorded immediately after the lead-in area and immediately before the lead-out area.

In step ST14, verification is achieved for a program area sandwiched by the lead-in area and the lead-out area. According to the result of the verification, the changing process is performed. Specifically, the sparing table is updated.

Formatting is now completed for the portion in the entire disk area. Therefore, user data can be recorded into the program area of the formatted portion. As understood from the figures, the formatted portion includes the lead-in area, the program area, and the lead-out area.

It is assumed that data is gradually recorded into the formatted portion, as shown in step ST15. Recording progresses as indicated by an arrow "Rec." At some point of time, the program area becomes filled with data, and recording cannot be performed any more.

In such a case, extended formatting is executed.

As shown in step ST16, the lead-in area is deleted.

Then, the lead-out area is also deleted as shown in step ST17 illustrated in FIG. 3.

Null data is written into an extended area following the area where the data has been recorded, in step ST18. (In this step, the UDF file system, written in the area following the area where the data has been recorded, is overwritten and deleted.)

Verification is achieved for the extended area, and the sparing table is updated according to the result of the verification, in step ST19.

At this point of time, recording is possible. In step ST20, recording is executed from the data packet immediately following the data packets which have been recorded so far.

A partition map is appropriately adjusted in step ST21. A free-space map which indicates a new recordable area is updated in step ST22. An anchor volume description point is shifted according to the extension in step ST23.

Then, in step ST24, a new lead-in area is formed according to the achieved extension. In step ST25, a lead-out area is also formed.

In the UDF-grow-formatting process, a partial area is formatted first. When the recording capacity is running out as data recording progresses, the formatted area is extended by the process executed from step ST16 to step ST25.

Every time when the recording capacity runs out, extended formatting executed from step ST16 to step ST25 is performed. At the final stage, as shown in step ST26, the entire disk area is used.

The above-described formatting processes are executed according to instructions sent from a host computer, the processes including the full-formatting process in step ST1 to step ST4, first formatting in step ST11 to step ST14, and extended formatting in step ST16 to step ST25 of the UDF-grow-formatting process.

The full-formatting process or the UDF-grow-formatting process, described above, is conventionally applied to rewritable disks such as CD-RWs. These formatting processes take a very long time.

In the full-formatting process, since the entire disk area of a rewritable disk, such as a CD-RW, needs to be filled with fixed-length packets by null data or others, it takes a very long time. In addition, since user data cannot be recorded or reproduced (read) during formatting, the user has to wait for the formatting process to finish.

In the UDF-grow-formatting process, since formatting is first performed partially, the user waiting time is shorter than that in the full-formatting process.

In this case, however, since the lead-in area and the lead-out area are changed in extended formatting, a sufficient time reduction cannot be obtained.

SUMMARY OF THE INVENTION

The present invention has been made in consideration of the above situations. Accordingly, it is an object of the present invention to make the time for a formatting process for rewritable disks shorter.

The foregoing object is achieved in one aspect of the present invention through the provision of a disk drive apparatus for recording data into a rewritable disk by a fixed-length packet-write method and for reading recorded data, including formatting control means for applying a formatting process only to a local area which is a part of the entire recordable area of the rewritable disk and which does not include portions where a lead-in area and a lead-out area are to be formed; and recording control means for executing and controlling a data recording operation at an area formatted by the formatting control means.

The foregoing object is achieved in another aspect of the present invention through the provision of a disk formatting method for a rewritable disk in which data is recorded by a fixed-length packet-write method, including the step of applying a formatting process only to a local area which is a part of the entire recordable area of the rewritable disk and which does not include portions where a lead-in area and a lead-out area are to be formed.

The foregoing object is achieved in still another aspect of the present invention through the provision of a disk drive apparatus for recording data into a rewritable, optical disk and for reading recorded data, including: an optical pickup for emitting laser light in order to record data into the rewritable, optical disk and to read recorded data; formatting control means for applying a formatting process by the optical pickup only to a local area which is a part of the entire recordable area of the rewritable, optical disk and which does not include portions where a lead-in area and a lead-out area are to be formed; and recording control means for executing and controlling a data recording operation at an area formatted by the formatting control means.

In the present invention, formatting is applied not to the entire disk but to a local area which is regarded as the minimum required area. The local area does not include a lead-in area or a lead-out area.

With this formatting, a formatting process in which a fixed-length packet is filled with fixed data is quickly finished, and a user's writing request is soon ready to be accepted.

With this operation, even in extended formatting, the deletion or re-recording of a lead-in area and a lead-out area is not performed, and the required time is reduced by the amount used therefor otherwise.

Conventionally, a lead-in area and a lead-out area are recorded in a formatting process. In the present invention, they are recorded when a disk ejection request is made if the user needs them (wants them). Therefore, an operation for recording a lead-in area and a lead-out area is executed only when it is required.

BRIEF DESCRIPTION OF THE DRAWINGS

FIG. 8 is a view showing a CD-type EFM conversion table.

FIG. 25 is a flowchart of an ejection process according to the embodiment.

DESCRIPTION OF THE PREFERRED EMBODIMENTS

A disk drive apparatus (recording and reproduction (reading) apparatus) which can handle CD-Rs and CD-RWs, and a formatting operation to be executed therein will be described below as an embodiment of the present invention. The description includes the following items in that order.

1. Structure of disk drive apparatus
2. CD method
   2-1. Outline of CD method
   2-2. Signal format
   2-3. Rewritable disks
   2-4. ATIP
   2-5. Recording-area format
3. Disk formatting operation
   3-1. Fast formatting process
   3-2. Formatting start processing
   3-3. Fast formatting processing
   3-4. Ejecting processing
4. Modified embodiments
1. Structure of Disk Drive Apparatus CD-Rs are write-once-type media using organic pigment in a recording layer. CD-RWs are media using a phase-change technology to allow data to be rewritable.

The structure of a disk drive apparatus having a capability of recording and reproducing (reading) data into and from CD-type disks, such as CD-Rs and CD-RWs, according to a present embodiment will be described by referring to FIG. 4.

Figure 4:
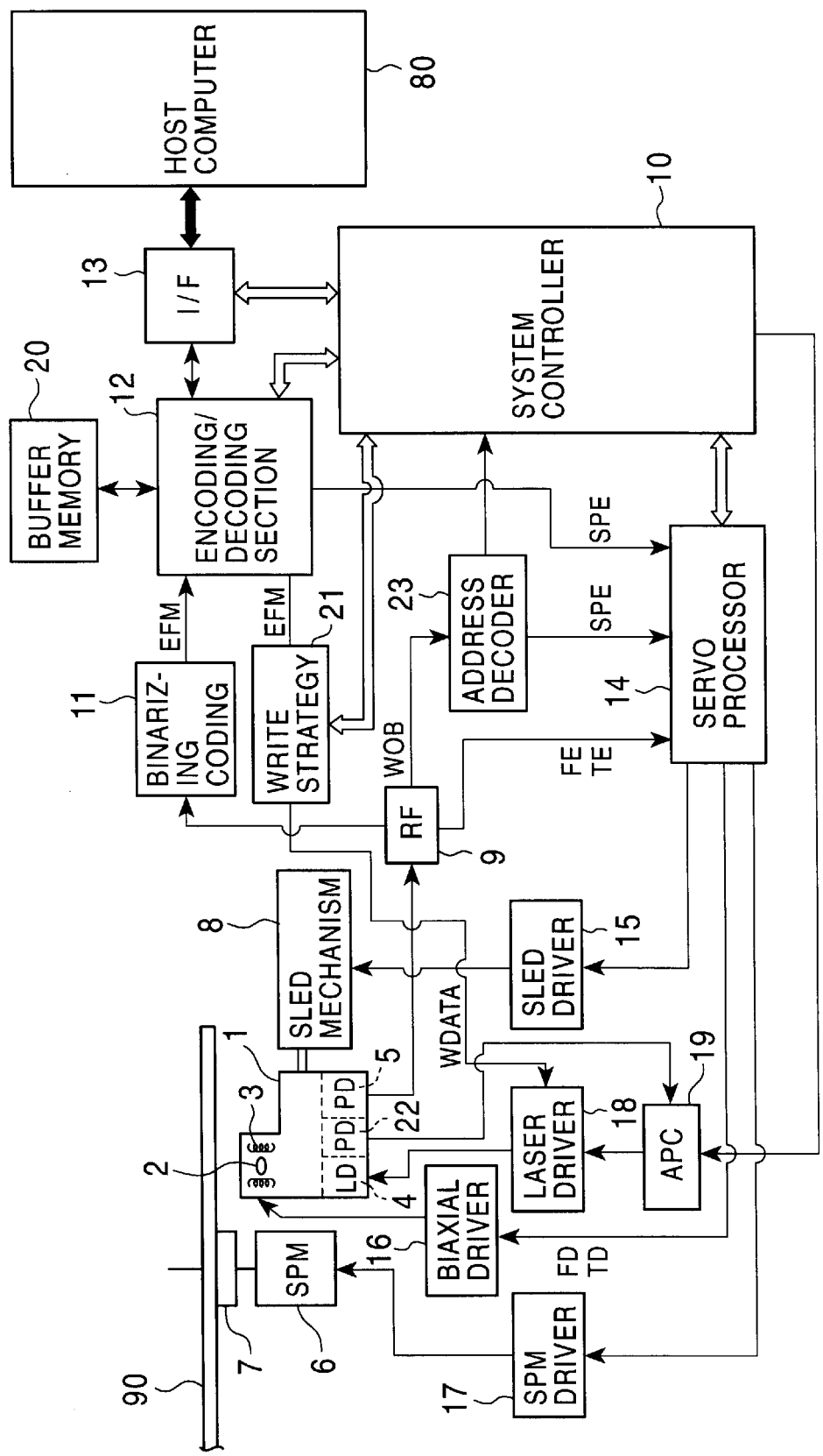
FIG. 4 is a block diagram of a disk drive apparatus according to an embodiment of the present invention.

In FIG. 4, a disk 90 is a CD-R or a CD-RW. Data can also be read from CD-DAs (CD-digital audio) and CD-ROMs when used as the disk 90.

The disk 90 is placed on a turntable 7, and rotated by a spindle motor 6 at a constant linear velocity (CLV) or at a constant angular velocity (CAV) during a recording or reproduction (reading) operation. An optical pickup 1 reads pit data (pits formed by reflectivity changes caused by phase changes or organic-pigment changes) on the disk 90. In CD-DAs and CD-ROMs, pits mean embossed pits.

The pickup 1 includes a laser diode 4 serving as a laser light source, a photo-detector 5 for detecting reflected light, an objective lens 2 serving as an output end of laser light, and an optical system (not shown) for illuminating a disk recording plane with the laser light through the objective lens 2 and for introducing reflected light to the photo-detector 5.

A monitoring detector 22 for receiving a part of the output light of the laser diode 4 is also provided.

The objective lens 2 is held so as to be able to be moved in a tracking direction and in a focus direction by a two-axis mechanism 3.

The entire pickup 1 is able to be moved in a disk radial direction by a sled mechanism 8.

Laser emission in the laser diode 4 of the pickup 1 is driven by a driving signal (driving current) sent from a laser driver 18.

The photo-detector 5 detects the information of light reflected from the disk 90, converts it to an electric signal corresponding to the amount of the received light, and sends to an RF amplifier 9.

The RF amplifier 9 is generally provided with an AGC circuit because the amount of light reflected from the disk 90 before, during, and after data recording into the disk 90 changes more than that from CD-ROMs, and further because the reflectivity of CD-RWs is largely different from those of CD-ROMs and CD-Rs.

The RF amplifier 9 includes a current-to-voltage conversion circuit for the current output from a plurality of light-receiving elements serving as the photo-detector 5, and a matrix-calculation and amplification circuit, and generates required signals by matrix calculation processing. The RF amplifier 9 generates, for example, an RF signal, which is a reproduced (read) data, and a focus-error signal FE and a tracking-error signal TE used for servo control.

The reproduced (read) RF signal output from the RF amplifier 9 is sent to a binarizing circuit 11, and the focus-error signal FE and the tracking-error signal TE are sent to a servo processor 14.

On the disk 90, a CD-R or a CD-RW, a groove is formed in advance serving as a guide for a recording track. The groove is wobbled by a signal obtained by frequency-modulating time information indicating absolute addresses on the disk. Therefore, in a recording operation, tracking servo can be applied by using groove information, and absolute addresses can be obtained from the wobbling information of the groove. The RF amplifier 9 extracts the wobbling information WOB by matrix calculation processing, and sends it to an address decoder 23.

The address decoder 23 demodulates the sent wobbling information WOB to obtain absolute-address information, and sends it to a system controller 10.

The groove information is also sent to a PLL circuit to obtain the rotation-speed information of the spindle motor 6. The rotation-speed information is compared with reference-speed information to generate and output a spindle-error signal SPE.

The binarizing circuit 11 binarizes the reproduced RF signal obtained by the RF amplifier 9 to obtain a so-called EFM signal (8–14 modulation signal), and sends it to an encoding/decoding section 12.

The encoding/decoding section 12 includes a functional part serving as a reproduction (reading) decoder and a functional part serving as a recording encoder.

In reproduction (reading), decoding processing, such as EFM demodulation, CIRC error correction, deinterleaving, and CD-ROM decoding, is executed to obtain reproduced (read) data which has been converted to CD-ROM-format data.

The encoding/decoding section 12 also applies sub-code extraction processing to data read from the disk 90 to send a TOC and address information, which are sub codes (Q data), to the system controller 10.

In addition, the encoding/decoding section 12 generates a reproduction (reading) clock synchronized with the EFM signal by PLL processing, and executes the above-described decoding processing by using the reproduction clock. The rotation-speed information of the spindle motor 6 is obtained from the reproduction clock. The rotation-speed information is compared with the reference-speed information to generate and output a spindle-error signal SPE.

The encoding/decoding section 12 accumulates data decoded in the above-described way in a buffer memory 20 during reproduction.

Data buffered in the buffer memory 20 is read and output as the reproduction output of the disk drive apparatus.

An interface section 13 is connected to an external host computer 80, and transmits and receives recording data, reproduced data, and various commands to and from the host computer 80. A SCSI interface or an ATAPI interface is actually employed. During reproduction, reproduced data decoded and stored in the buffer memory 20 is output to the host computer 80 through the interface section 13.

Signals sent from the host computer 80, such as a read command and a write command, are sent to the system controller 10 through the interface section 13.

Recording data (such as audio data and CD-ROM data) is sent from the host computer 80 during recording. The recording data is sent to the buffer memory 20 through the interface 13 and buffered there.

In this case, the encoding/decoding section 12 applies encoding processing to the buffered recording data, such as encoding processing to change CD-ROM-format data to CD-format data (when the sent data is CD-ROM data), CIRC encoding and interleaving, sub-code addition, and EFM demodulation.

A write strategy 21 applies waveform adjusting processing to the EFM signal obtained by the encoding processing executed in the encoding/decoding section 12, and then, sends it to the laser driver 18 as a laser driving pulse (write data WDATA).

The write strategy 21 performs recording compensation, namely, the fine adjustment of the most appropriate recording power in terms of recording-layer characteristics, the spot shape of laser light, and a recording linear velocity.

The laser driver 18 sends the laser driving pulse received as the write data WDATA to the laser diode 4 to execute laser-light-emission driving. With this operation, pits (such as phase-change pits and pigment-change pits) corresponding to the EFM signal are formed on the disk 90.

An APC (auto-power control) circuit 19 is a circuit section for controlling a laser output so as to be constant irrespective of the temperature and other factors while monitoring the laser output power by the output of the monitoring detector 22. The APC circuit controls the laser driver 18 such that the laser output level matches a target laser output given from the system controller 10.

A servo processor 14 generates various servo driving signals, such as a focus driving signal, a tracking driving signal, a sled driving signal, and a spindle driving signal, from the focus-error signal FE and the tracking-error signal TE sent from the RF amplifier 9 and the spindle-error signal SPE sent from the encoding/decoding section 12 or the address decoder 20 to execute a servo operation.

More specifically, the focus driving signal FD and the tracking driving signal TD are generated from the focus-error signal FE and the tracking-error signal TE, and are sent to the two-axis driver 16. The two-axis driver 16 drives a focus coil and a tracking coil in the two-axis mechanism 3 of the pickup 1. With this, a tracking servo loop and a focus servo loop are formed by the pickup 1, the RF amplifier 9, the servo processor 14, the two-axis driver 16, and the two-axis mechanism 3.

In response to a track jump instruction sent from the system controller 10, the tracking servo loop is turned off. A jump driving signal is output to the two-axis driver 16 to execute a track jump operation.

The servo processor 14 also sends a spindle driving signal generated according to the spindle error signal SPE, to a spindle-motor driver 17. The spindle-motor driver 17, for example, applies a three-phase driving signal to the spindle motor 6 according to the spindle driving signal to achieve the CLV rotation or the CAV rotation of the spindle motor 6. The servo processor 14 also generates a spindle driving signal according to a spindle kick/brake control signal sent from the system controller 10 to make the spindle-motor driver 17 operate (start, stop, accelerate, or decelerate) the spindle motor 6.

The servo processor 14 further generates the sled driving signal according to a sled error signal obtained as a lower-frequency component of the tracking error signal TE and according to access execution control operated by the system controller, and sends it to a sled driver 15. The sled driver 15 drives the sled mechanism 8 according to the sled driving signal. The sled mechanism includes a main shaft for holding the pickup 1, a sled motor, and a transmission gear (none of them shown). The sled driver 15 drives the sled motor 8 according to the sled driving signal to achieve a predetermined slide movement of the pickup 1.

The system controller 10, formed of a microcomputer, controls various operations, described above, in the servo system and in the recording and reproduction system.

The system controller 10 executes various processes according to commands sent from the host computer 80.

When the host computer sends a read command for requesting the transmission of data recorded in the disk 90, for example, seek operation control is first achieved with a specified address being set to the target. More specifically, the system controller sends an instruction to the servo processor 14 to make the pickup 1 achieve an access operation with the address specified by a seek command being set to the target.

Then, operation control required for sending data disposed in a specified data zone to the host computer 80 is performed. Specifically, the data is read from the disk 90, decoded, buffered, and sent.

When the host computer 80 sends a write command, the system controller 10 first moves the pickup 1 to an address where data is written. Then, the system controller 10 makes the encoding/decoding section 12 apply encoding processing, described above, to data transmitted from the host computer 80 to change it to an EFM signal.

As described above, write data WDATA is sent from the write strategy 21 to the laser driver 18 to execute recording.

2. CD Method 2-1. Outline of CD method

The signal processing forms, the structures, and others of CD-type disks, such as CD-DAs, CD-ROMs, CD-Rs, and CD-RWs, will be described next.

Figure 5:
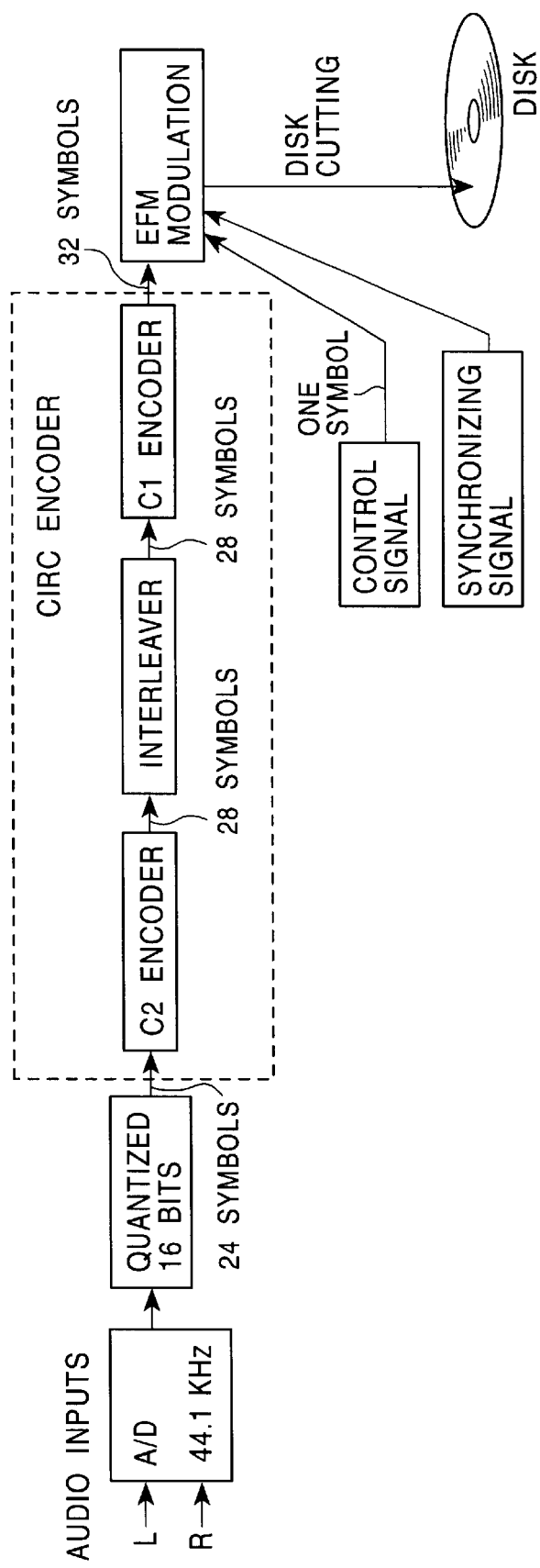
FIG. 5 is a view showing CD-type signal recording processing.
Figure 6:
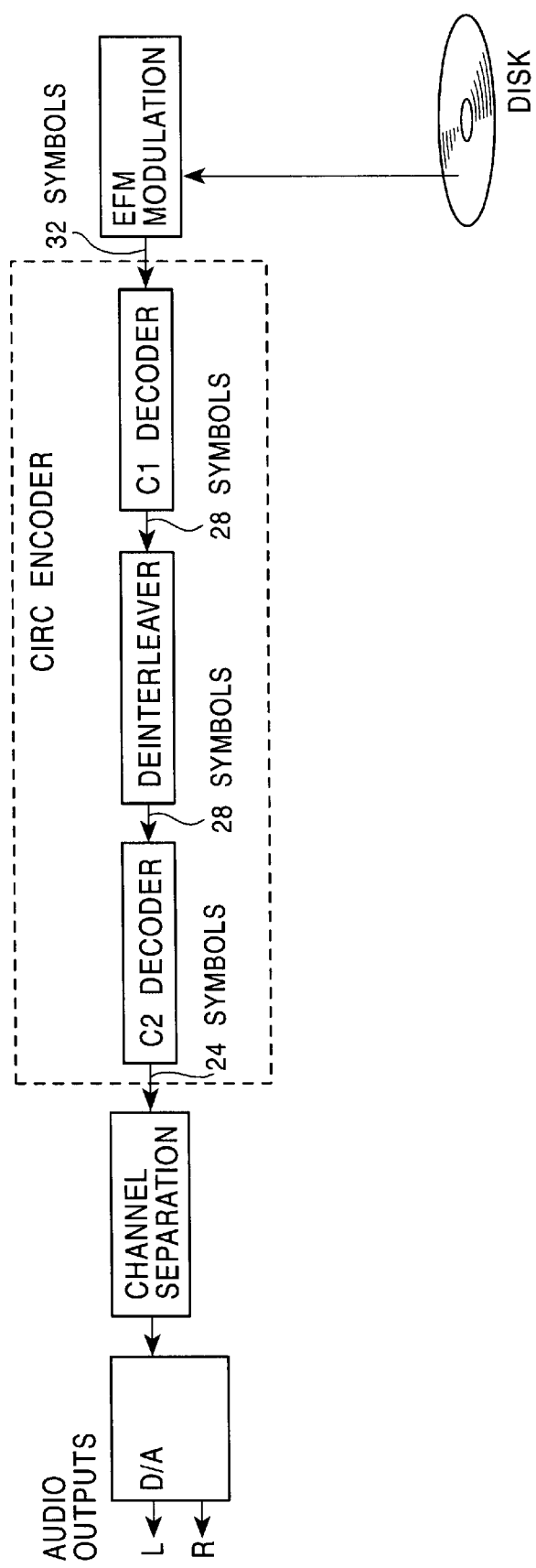
FIG. 6 is a view showing CD-type signal reading processing.

FIG. 5 and FIG. 6 show CD-type signal processing sequences.

FIG. 5 shows an outline of signal processing used for recording a stereo audio signal into a disk.

Left-channel (L-ch) and right-channel (R-ch), input audio signals are sampled at a sampling frequency of 44.1 kHz, and then linearly quantized at 16 bits. 16 bits are set to one word, and are handled in units of eight bits, which corresponds to one symbol (one symbol=eight bits=half word).

A C2 encoder shown in FIG. 5 adds ECC (error correcting code) for error detection and correction. The C2 encoder receives six samples of L-ch and R-ch signals, namely, 16 bits×2 channels×6 samples=192 bits=24 symbols, and adds four symbols of ECC (Q parity) to form 28 symbols. In the CD method, the Reed-Solomon code is generated and added as the ECC.

Interleaving is used for a large continuous defect (burst defect) on an optical-disk substrate.

Figure 7:
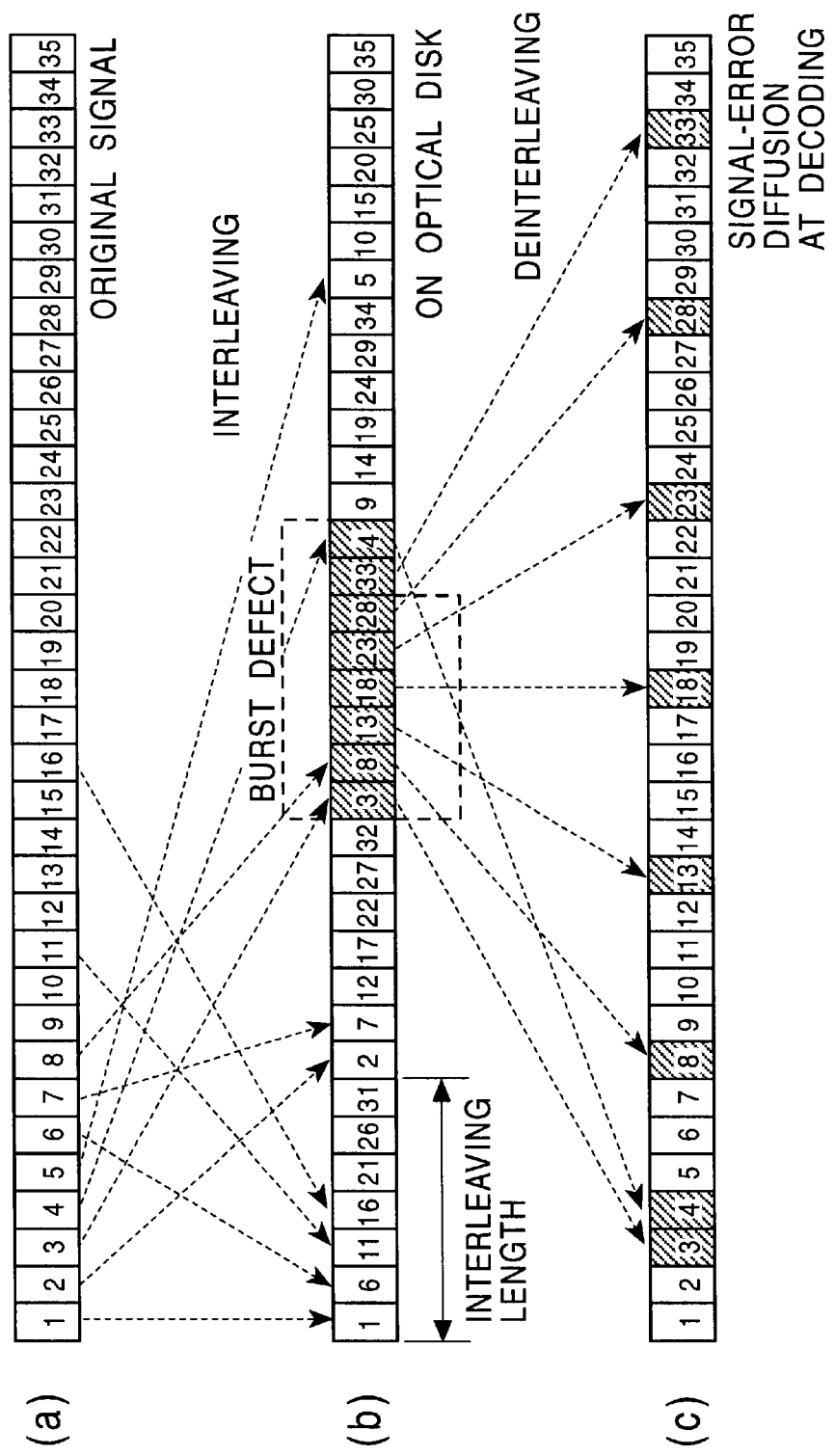
FIG. 7 is a view showing the principle of CD-type interleaving.

FIG. 7 shows the principle of interleaving. The original signal string shown in FIG. 7(a) is interleaved (re-arranged in a different order), and recorded on the optical-disk plane as a signal string shown in FIG. 7(b). Even if a burst defect occurs on the disk plane, deinterleaving, which is reverse to interleaving, is achieved in decoding to return the signal string to that shown in FIG. 7(c). It is understood by hatched areas that the data section affected by the burst defect on the optical-disk substrate is diffused on the signal string after decoding.

Since a burst error is diffused in this way, the original signal string is set to an error-correction possible state, and a data reproduction capability is increased.

In FIG. 5, a C1 encoder further generates and adds four symbols of Reed-Solomon code (P parity) to make 32 symbols after interleaving, adds one control symbol (sub code) thereto, and achieves EFM modulation (eight-to-fourteen modulation). In EFM modulation, eight bits are extended to 14 bits.

In EFM modulation, quantized 16 bits are divided into upper eight bits and lower eight bits; and these eight bits are handled as the minimum signal units and eight bits are converted to 14 bits such that the minimum number of continuous bits is three, the maximum number of continuous bits is 11, and two to 10 "0's" are disposed between "1" and "1." After the conversion, "1" indicates a symbol inversion (NRZ-I).

FIG. 8 shows a part of the conversion from eight bits to 14 bits in the EFM modulation. As shown in FIG. 8, the 14-bit values corresponding to all eight-bit data items from "00000000" to "11111111" are specified.

Figure 9:
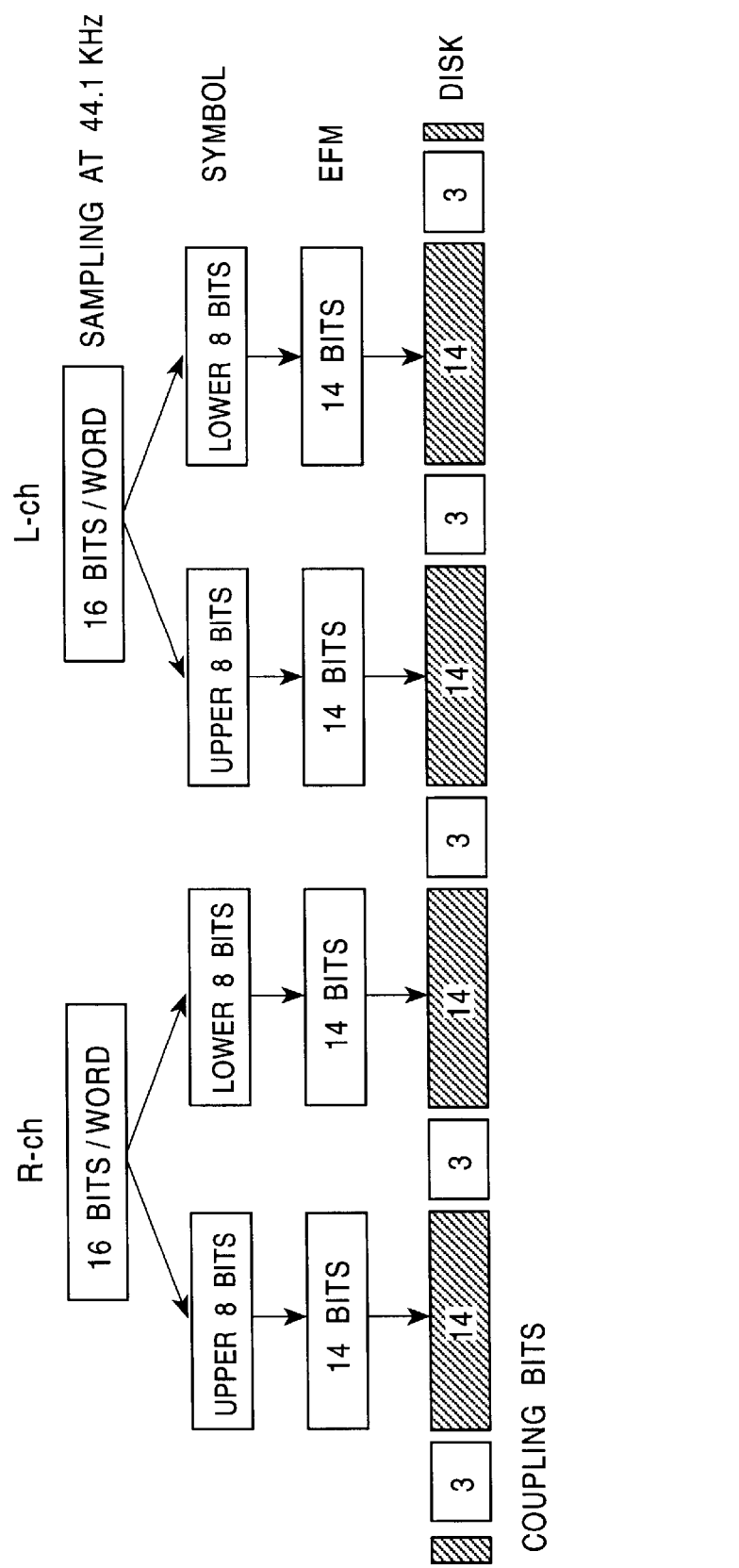
FIG. 9 is a view showing a CD-type EFM conversion operation.

Objects of the EFM modulation are as follows:
(1) To reduce a frequency range used for recording and to select a frequency band where recording and reproduction of data into and from a disk is easy in order to enable long-time recording (the frequency increases as the number of times data is inverted between "1" and "0")
(2) To make clock reproduction easy
(3) To reduce a DC component FIG. 9 shows the flow of the EFM conversion.

16-bit data for each of the left channel and the right channel is divided into upper eight bits and lower eight bits, and each set of eight bits is converted to 14 bits by the table shown in FIG. 8. Each set of 14 bits is coupled through coupling bits to form a recording data stream.

In the EFM modulation, each symbol is converted to a bit pattern having 14 bits. From 14 bits, $2^{14}$=16,384 patterns can be made, but since the original symbol has eight bits, only $2^8$=256 patterns are made.

Therefore, 256 appropriate patterns are selected from 16,384 patterns.

From the above description, 267 patterns are possible when two to 10 "0's" are disposed between "1" and "1" and 256 patterns are selected therefrom. At least two coupling bits are required to satisfy a restriction in which two "0's" or more are disposed between "1" and "1" even between symbols. In CDs, three coupling bits are used between symbols to provide a degree of freedom for reducing a low-frequency component. With these three coupling bits, nine bit lengths are possible from 3T to 11T even between symbols, where 3T (0.9 ns) equals the minimum period between "1's" and 11T (3.3 ns) equals the maximum period.

As shown in FIG. 5, a frame synchronizing signal, and a control signal constituting a sub code are further added to EFM-modulated data (frame), and the resultant data stream is recorded in the disk. The frame synchronizing signal and the sub code will be described later.

FIG. 6 shows an outline of signal processing used for reproducing (reading) a data string recorded as described above. Data is decoded in the process reverse to the recording process.

More specifically, a data string read from the disk is EFM demodulated, C1-decoded, deinterleaved, and C2 decoded. Then, channel separation is achieved. Audio data for L-ch and R-ch having 16 quantization bits and a sampling frequency of 44.1 kHz is D/A converted, and output as stereo audio signals.

2-2. Signal Format

The CIRC converts data of six samples for each of the left and right two channels sampled at 44.1 kHz to 32 symbols. These 32 symbols need to be collectively handled as a group. A frame synchronizing signal is added at the beginning in order that the 32 symbols are collectively handled.

In the CD method, a two-consecutive-Tmax pattern is used as a frame synchronizing signal. Namely, the frame synchronizing signal is set to a 24-bit pattern of "100000000000100000000000010."

Figure 10:
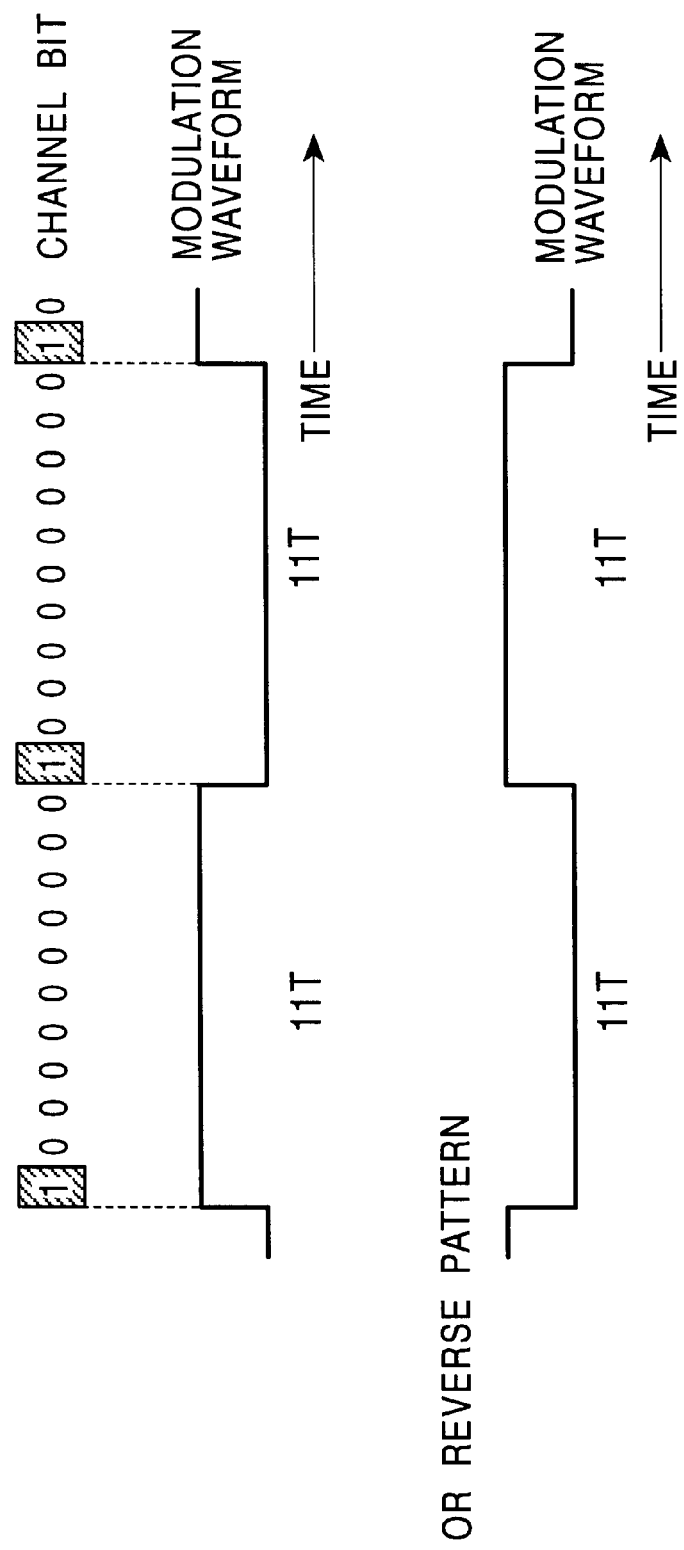
FIG. 10 is a view showing a CD-type synchronizing-signal pattern.

Since an inversion is indicated by "1," modulated waveforms have patterns shown in FIG. 10.

Figure 11:
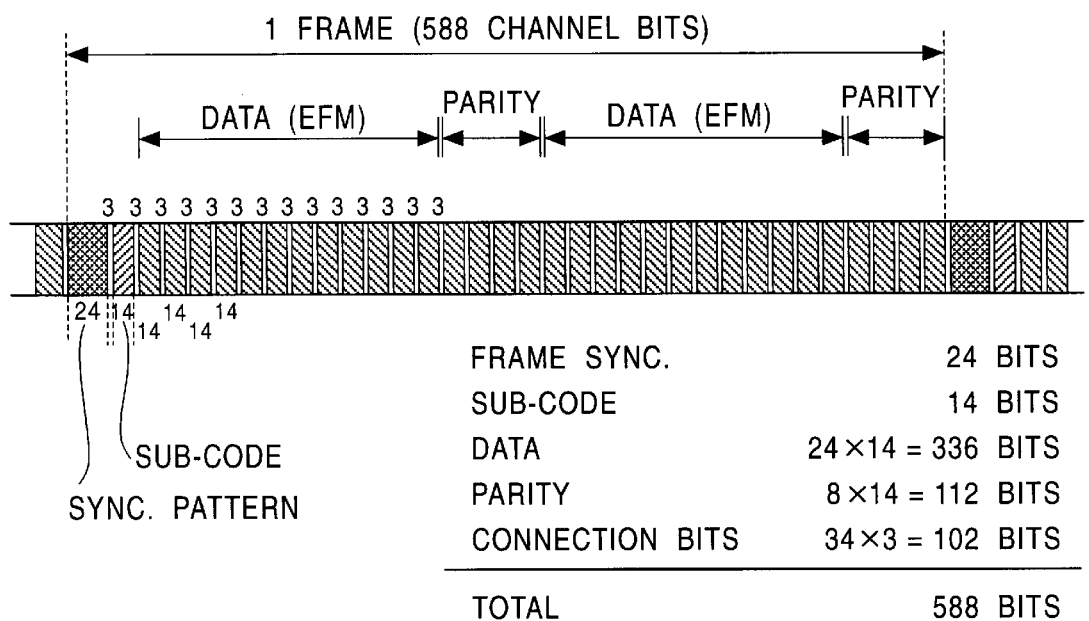
FIG. 11 is a view showing a CD-type frame format.

FIG. 11 shows the frame format of the CD method. One frame is formed of a total of 588 bits, including:
 frame synchronizing signal: 24 bits
 sub coding: one symbol=14 bits
 digital audio data and its parity: 32 symbols=32×14 bits
 coupling bits between symbols: 3×34=102 bits Since one frame corresponds to six sampling periods, the frequency of the frame is 44.1 kHz/6 samples=7.35 kHz. One frame includes 588 bits, and therefore, a reproduction clock has a frequency of 7.35 kHz×588=4.3218 MHz.

In one frame, a 14-bit sub code is disposed following the frame synchronizing signal.

Figure 12:
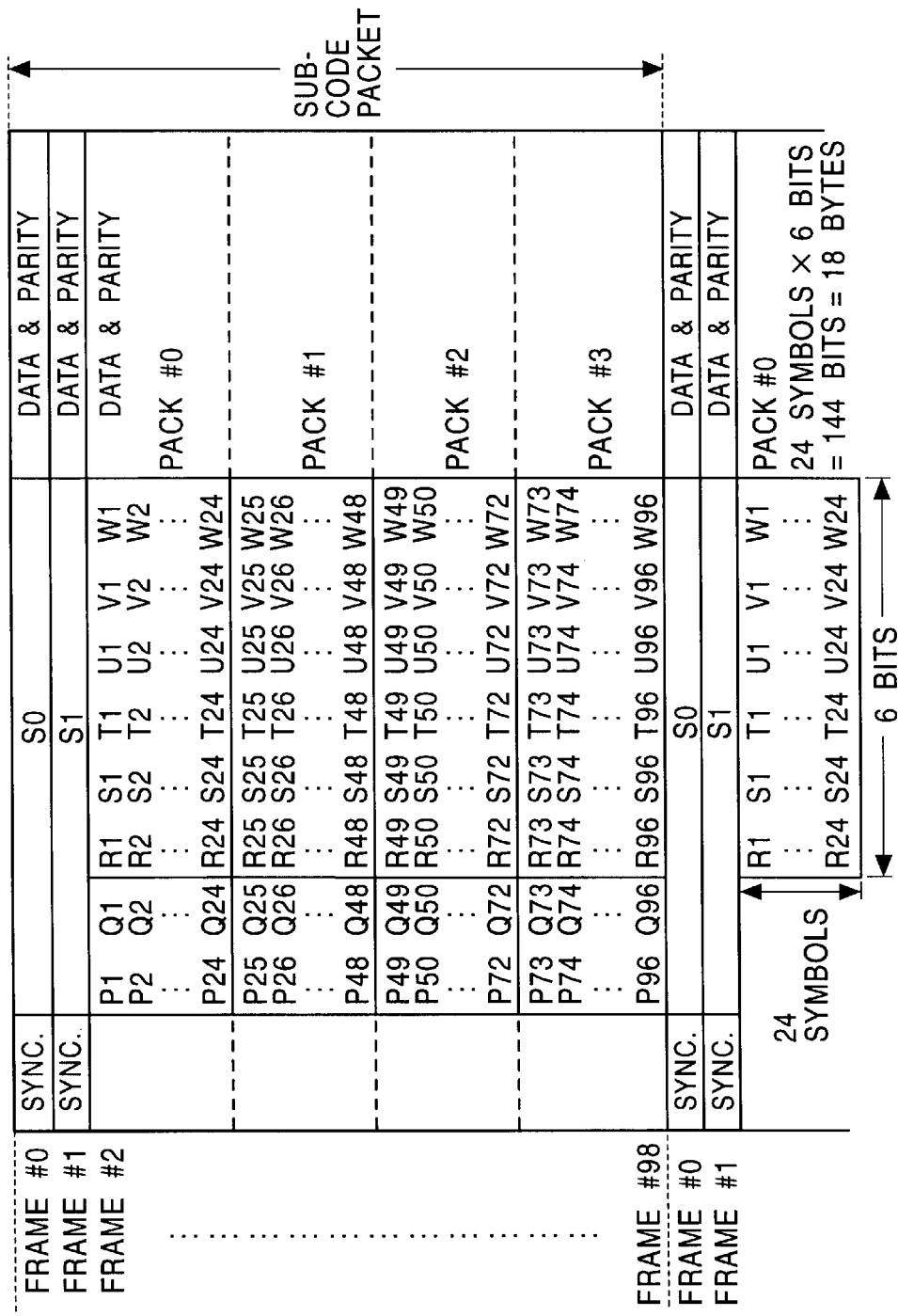
FIG. 12 is a view showing a CD-type sub-code frame format.

This 14-bit sub code is taken out from each of 98 frames to form one sub-code block as shown in FIG. 12.

The sub code is used, for example, for
(1) searching for the beginning of a musical piece and for implementing a program function in which musical pieces are played in an order specified in advance
(2) recording additional information such as text information.

At the top frame #0 and the next frame #1 of the sub-code block, synchronizing patterns S0 and S1 are placed to allow the beginning of the block to be identified. As S0 and S1, two patterns which are not listed in the EFM conversion table are used.

P1 to P96 and Q1 to Q96 are used as time information such as an absolute address, a track number, a pointer, and others. In the lead-in area of the disk, TOC information is formed by Q data. In the program area, an absolute time and a time in a track are indicated by Q data.

R to W can be used, for example, for recording text data.

2-3. Rewritable disks

In recordable disks such as CD-Rs and CD-RWs, only a laser-light guiding groove is formed on the substrate before recording. When the disk is illuminated with laser light which is data-modulated by a high power, the reflectivity of a recording film changes. With this principle, data is recorded.

A recording film which allows recording only once is formed on CD-Rs. This recording film is made from organic pigment. A high power laser is used to achieve drilling recording.

A recording film which allows multiple-times rewriting is formed on CD-RWs. Phase-change recording is employed. Data is recorded as a reflectivity difference between a crystalline state and a non-crystalline state.

Since reproduction-only CDs and CD-Rs have a reflectivity of 0.7 or more and CD-RWs have that of about 0.2 due to physical characteristics, reproduction apparatuses designed for disks having a reflectivity of 0.7 or more cannot reproduce (read) data from CD-RWs. Therefore, an AGC (auto gain control) function for amplifying weak signals is added to allow reproduction.

The lead-in area, disposed at the inner periphery of a disk, is placed at positions having radii of 46 mm to 50 mm in CD-ROMs, and no bit exists more inside the lead-in area.

Figure 13:
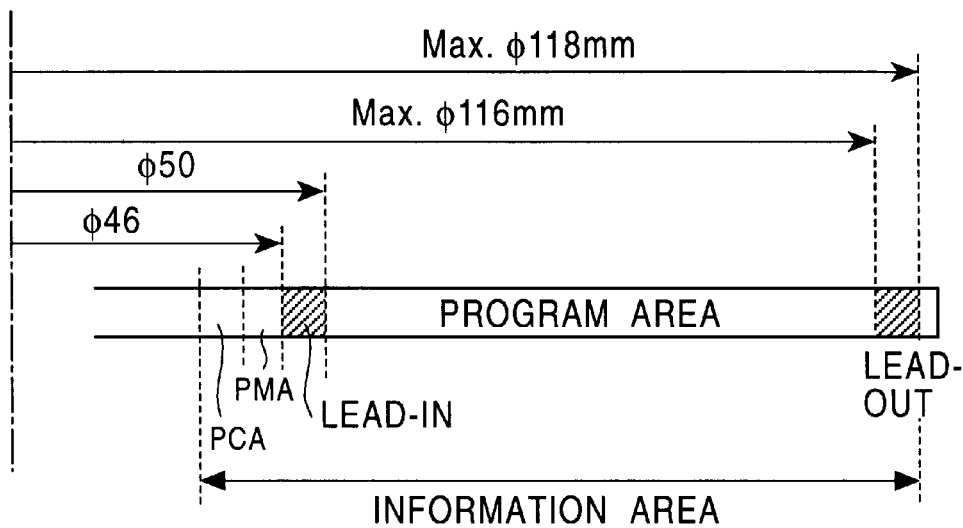
FIG. 13 is a view showing a layout in a disk.

As shown in FIG. 13, in CD-Rs and CD-RWs, a PMA (program memory area) and a PCA (power calibration area) are formed at the inner side of the lead-in area.

Drive apparatuses which can handle CD-Rs and CD-RWs record data in the lead-in area and in the program area following the lead-in area, used for recording actual data, and reproduce recorded contents in the same way as for CD-DAs.

The PMA temporarily stores the mode of a recording signal, and start-and-end-time information every time data is recorded into a track. After data has been recorded into all tracks to be used, a TOC (table of contents) is formed in the lead-in area according to the information.

The PCA is used for writing data on trial in order to obtain the most appropriate laser power value for recording.

On CD-Rs and CD-RWs, a groove (guiding groove) constituting a data track is formed in a wobbling manner in order to control a recording position and spindle rotation.

The groove is wobbled according to a signal modulated by information such as an absolute address, and therefore includes the information such as the absolute address. The absolute-time information represented by the wobbled groove is called an absolute time in pregroove (ATIP).

Figure 14:
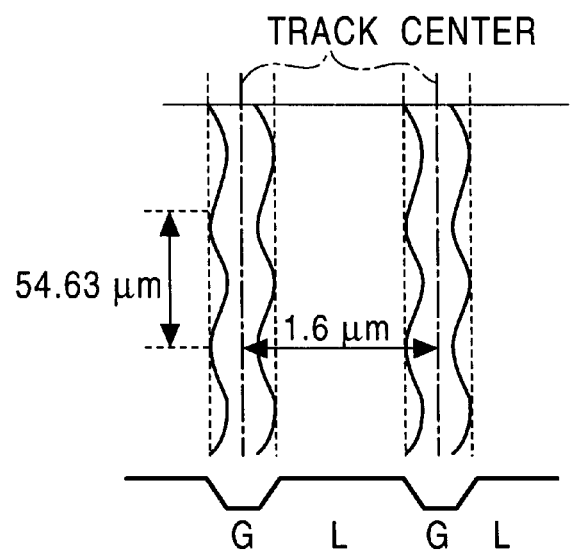
FIG. 14 is a view of a wobbling groove.

The wobbled groove is meandered in a slightly sine-wave manner as shown in FIG. 14. Its central frequency is 22.05 kHz and the amount of wobbling is about ±0.03 μm.

The following pieces of information is encoded by FM modulation in the wobbled groove.

Time-Axis Information

This time-axis signal is called ATIP, increases monotonously toward the outer periphery of the disk from the beginning of the program area, and is recorded and used for address control for data recording.

Recommended Recording Laser Power

This is the recommended value of the manufacturer. Since the most appropriate power actually changes according to various conditions, a process for determining the most appropriate recording power before recording is provided. This process is called optimum power control (OPC).

Usage of Disk

This is called an application code. The following items apply.

Restricted Use

General Purpose: For general business

Special Purpose: For special cases, such as for photo CDs and "karaoke" CDs

Unrestricted Use: For commercial audio 2-4. ATIP

When the spindle motor is controlled such that a wobbling signal detected from the groove of a CD-R or a CD-RW by a push-pull channel has a central frequency of 22.05 kHz if the disk is rotated at a standard speed, the disk is rotated exactly at a linear speed of 1.2 m/s to 1.4 m/s, specified by the CD method. Absolute-time information encoded as a sub code Q can be used in CD-ROMs. In disks (blank disks) before recording, since this information is not obtained, the absolute-time information included in the wobbling signal is used.

One ATIP sector matches one data sector (2,352 bytes) in a main channel after recording. Data is written while the ATIP sector and the data sector are synchronized.

Figure 15:
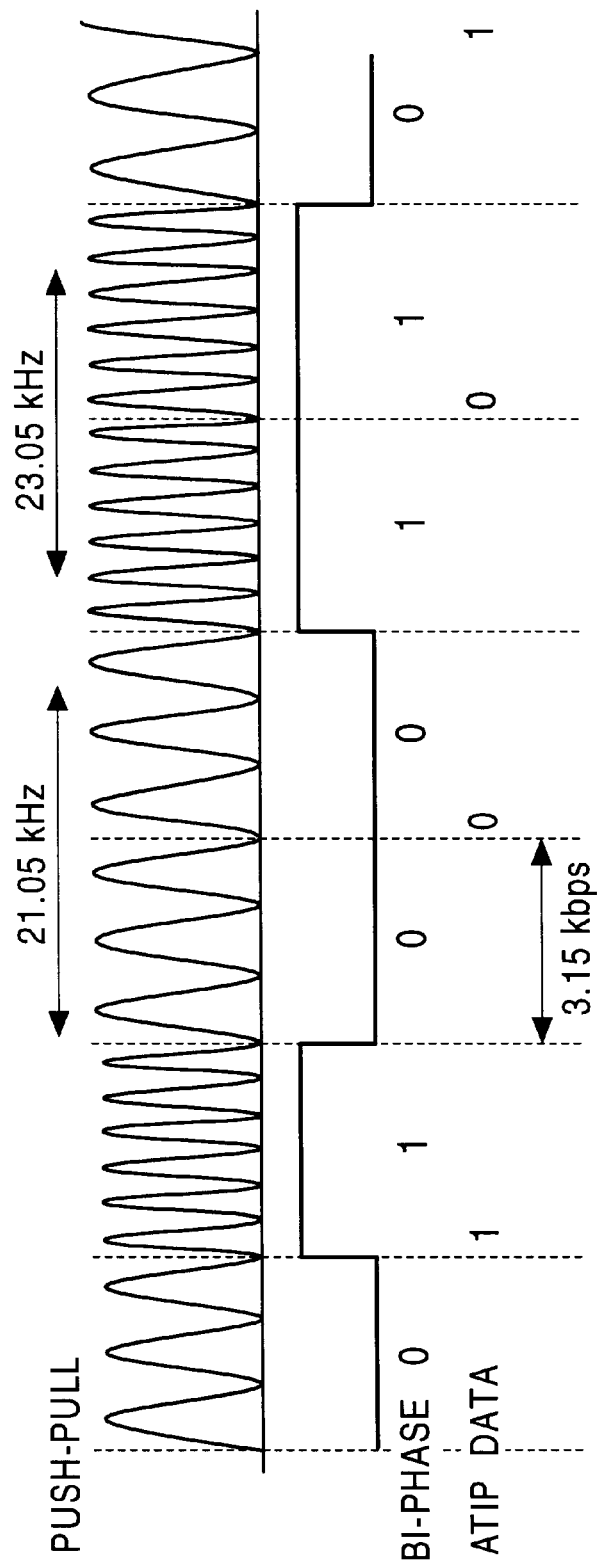
FIG. 15 is a view showing ATIP encoding.

The ATIP information is not encoded as is as a wobbling signal. As shown in FIG. 15, the ATIP information is bi-phase-modulated, and then FM-modulated. This is because the wobbling signal is also used for rotation control. With bi-phase modulation, "1" and "0" alternate at a predetermined period and the average number of "1" matches that of "0." The FM-modulated wobbling signal is set to have an average frequency of 22.05 kHz. Recording laser power setting information is also encoded and placed in the ATIP as special information, in addition to the time information. In CD-RW disks, special information is extended, and power for CD-RWs and recording pulse information are encoded.

Figure 16:
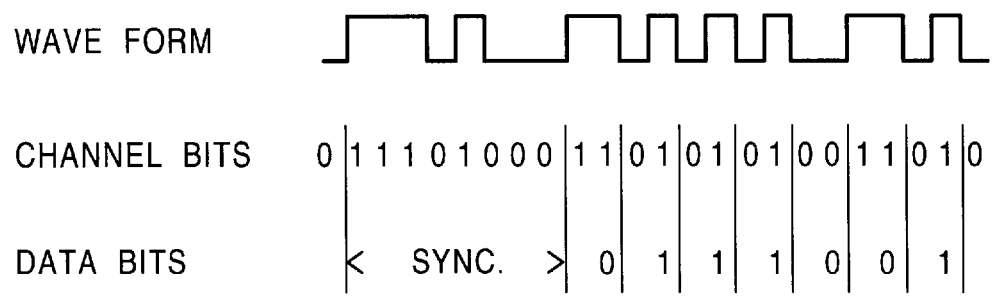
FIG. 16 is a view showing an ATIP waveform.
Figure 17:
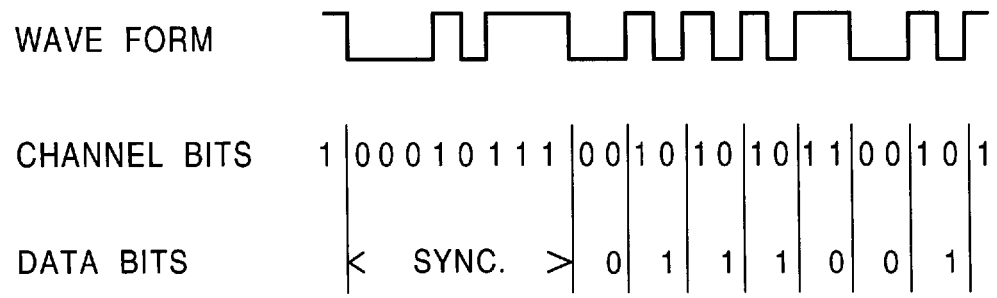
FIG. 17 is a view showing another ATIP waveform.

The ATIP information uses synchronizing patterns shown in FIG. 16 and FIG. 17. When a leading bit is "0," a pattern of "11101000" is used. When a leading bit is "1," a pattern of "00010111" is used.

2-5. Recording area format

Figure 18:
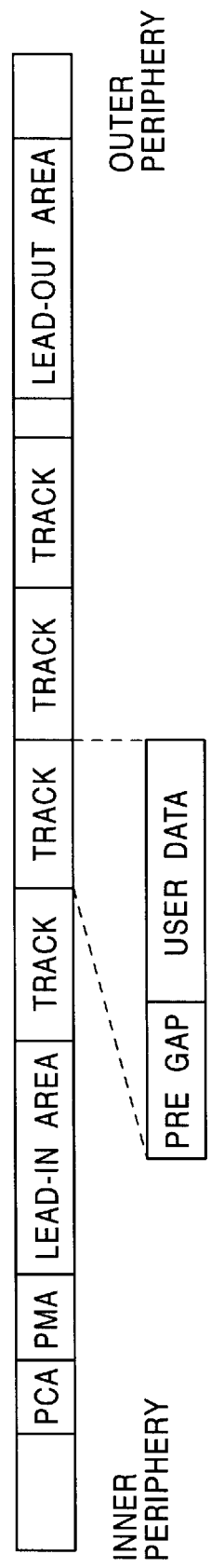
FIG. 18 is a view showing a recording-area format.
Figure 19:
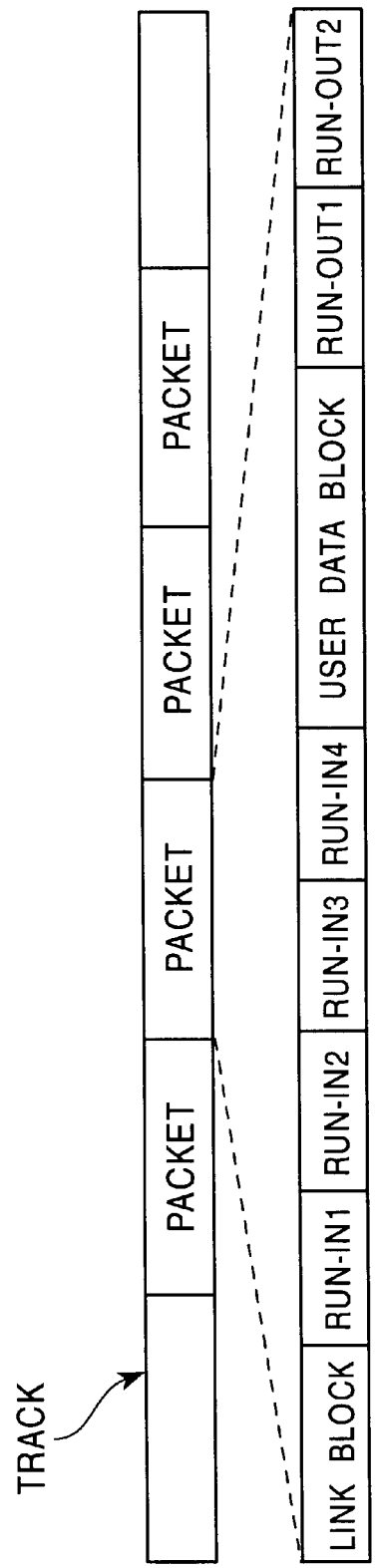
FIG. 19 is a view showing a track format.

A format which the disk drive apparatus uses to record data into a recording area of a recordable optical disk will be described below. FIG. 18 is a view showing the format of the recording area of a recordable optical disk. FIG. 19 is a view showing a format in a track shown in FIG. 18.

The disk drive apparatus formats the disk so as to form a power calibration area (PCA), an intermediate recording area (program memory area, PMA), a lead-in area, one or a plurality of tracks, and a lead-out area in that order from the inner periphery, as shown in FIG. 18.

The disk drive apparatus divides each track into a plurality of packets and records user data by the packet-write method, as shown in FIG. 19.

The PCA shown in FIG. 18 is used for test recording for adjusting a laser-light output power.

Each track records used data.

The lead-in area and the lead-out area record table-of-contents (TOC) information, such as the start address and the end address of a track, and various pieces of information related to the optical disk.

The PMA records the table-of-contents information of a track for temporary storage.

Each track is formed of a pre gap for recording track information and a user-data area for recording user data.

Each packet shown in FIG. 19 includes one or more readable user-data blocks; five blocks for linking provided before the user-data blocks, formed of one link block and four run-in blocks; and two blocks for linking provided after the user-data blocks, formed of two run-out blocks.

The link block is required for linking packets.

In the fixed-length packet-write method, a plurality of tracks are formed in the recording area of a rewritable optical disk, each track is divided into a plurality of packets, the number of user-data blocks (block length) in each packet of one track is fixed to an identical number, and data is collectively written in units of packets.

Therefore, in the fixed-length packet-write method, the same packet length is used for each packet in one track, and the same number of user-data blocks is used in each packet.

Figure 20:
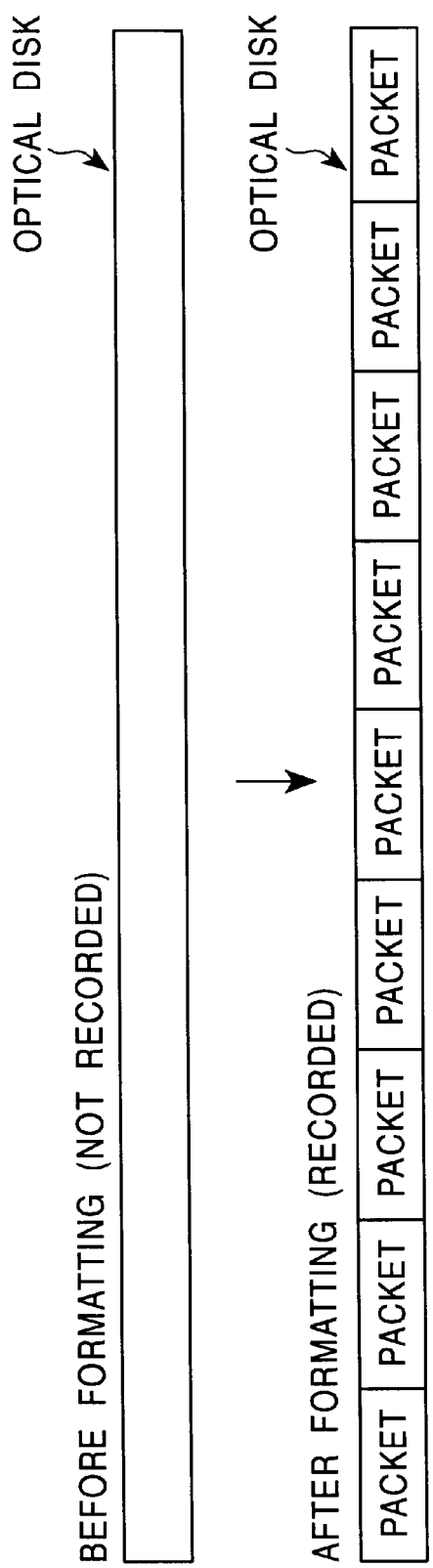
FIG. 20 is a view showing a fixed-length-packet disk format.

FIG. 20 shows the recording-area format of an optical disk to which the disk drive apparatus has applied formatting.

When fixed-length-packet formatting is applied to the entire recording area or a specified area which has not yet formatted, the area is filled with fixed-length packets.

3. Disk formatting operation 3-1. Fast-formatting process

A disk formatting process according to the present embodiment will be next described. This formatting process according to the present embodiment is called a fast-formatting process in the following description to differentiate from the full-formatting process and the UDF-grow-formatting process shown in FIG. 1, FIG. 2, and FIG. 3.

The fast-formatting process according to the present embodiment will be described by referring to FIG. 21 and FIG. 22. In the drive apparatus shown in FIG. 4, the system controller 10 executes the control of the fast-formatting process according to instructions sent from the host computer 80.

Figure 1:
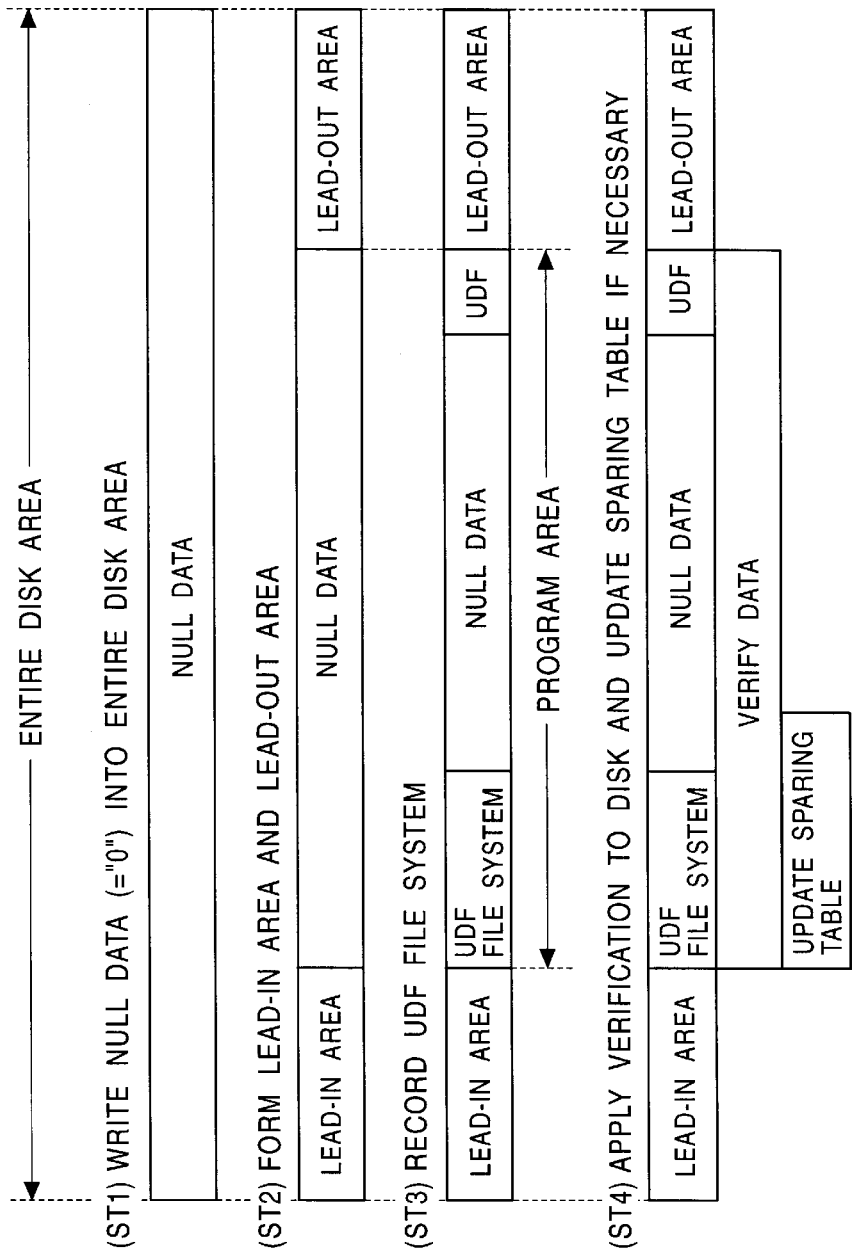
FIG. 1 is a view showing a full-formatting process.
Figure 2:
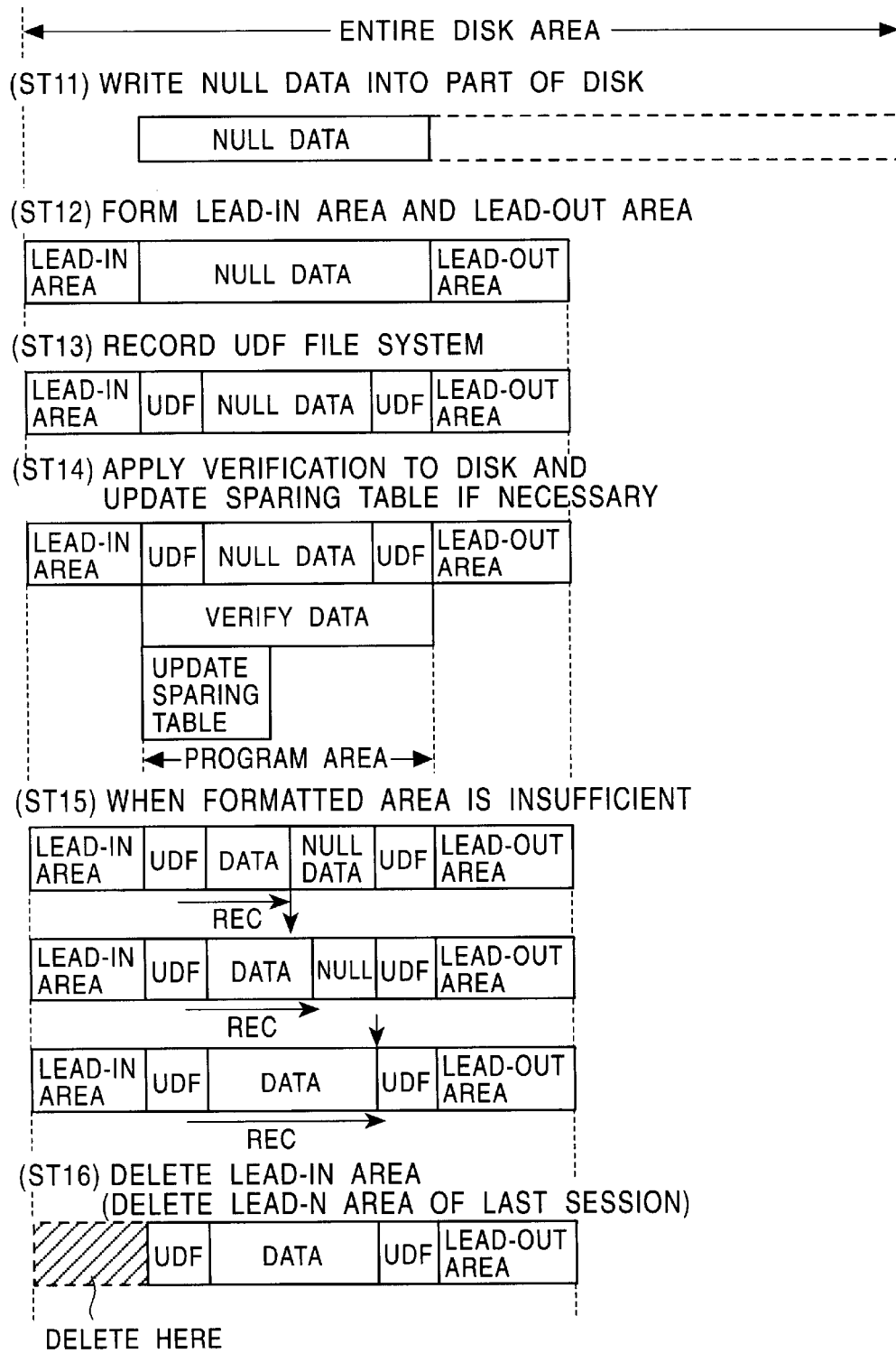
FIG. 2 is a view showing a UDF-grow-formatting process.
Figure 3:
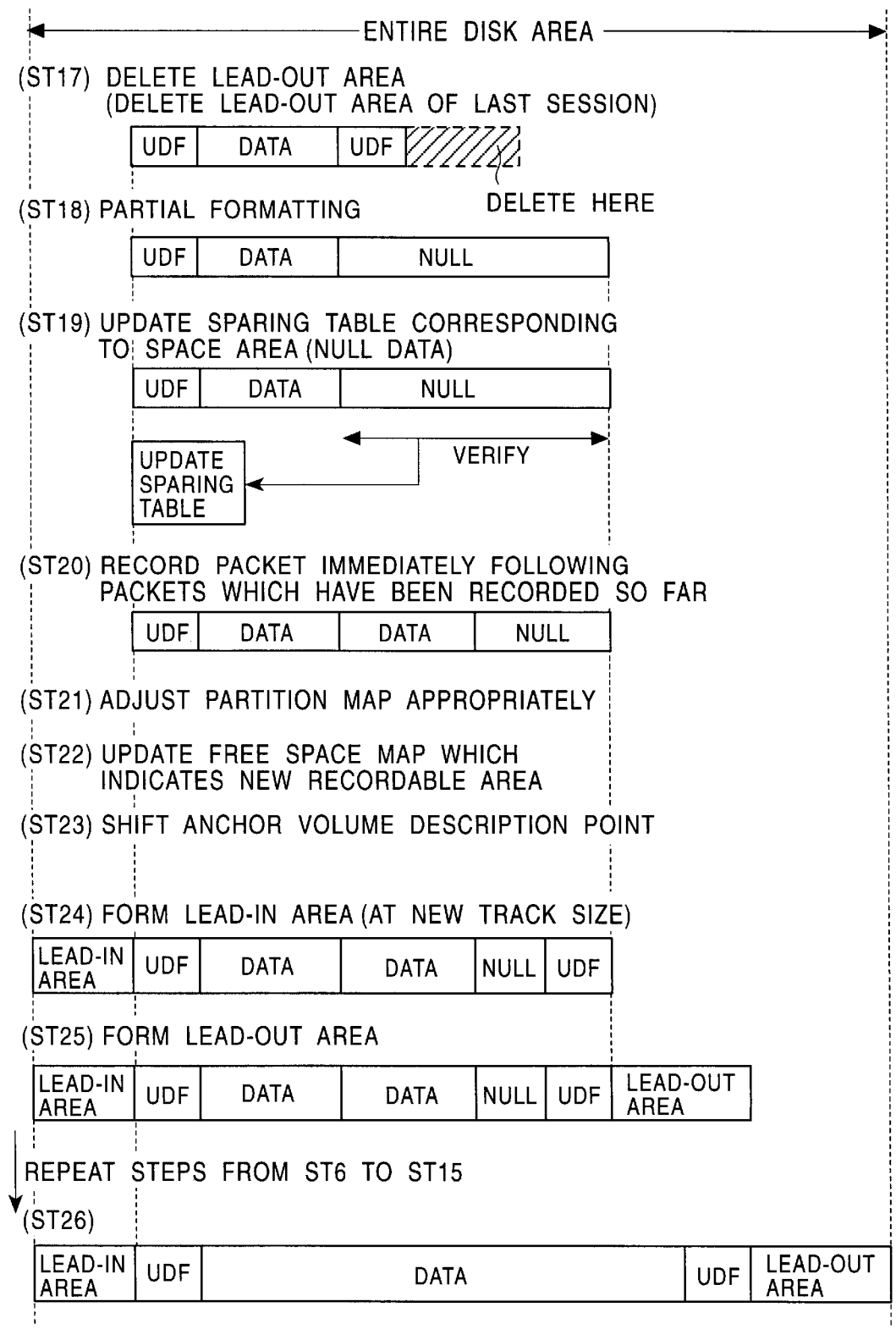
FIG. 3 is a view showing the UDF-grow-formatting process.
Figure 21:
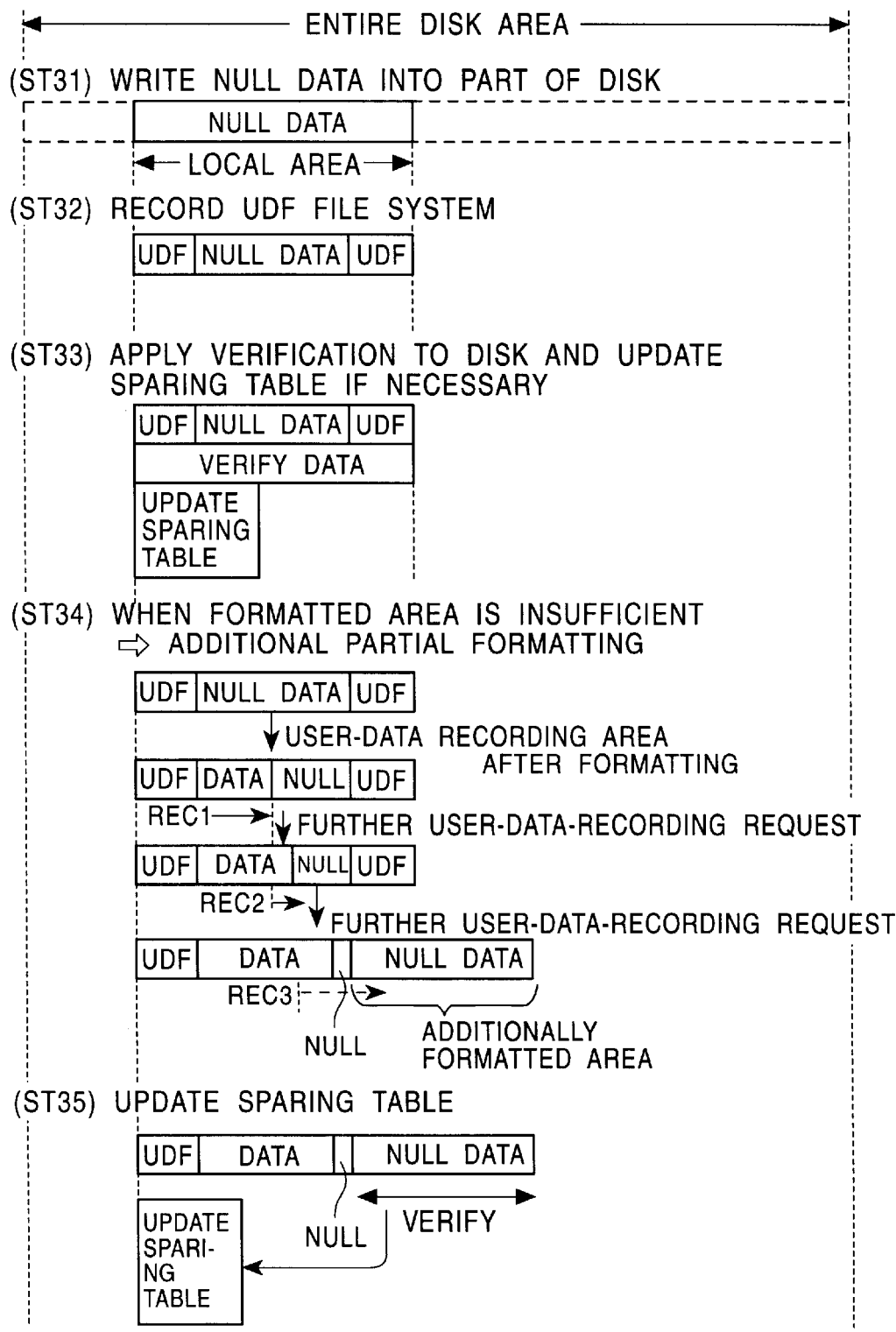
FIG. 21 is a view showing a fast-formatting process according to an embodiment.
Figure 22:
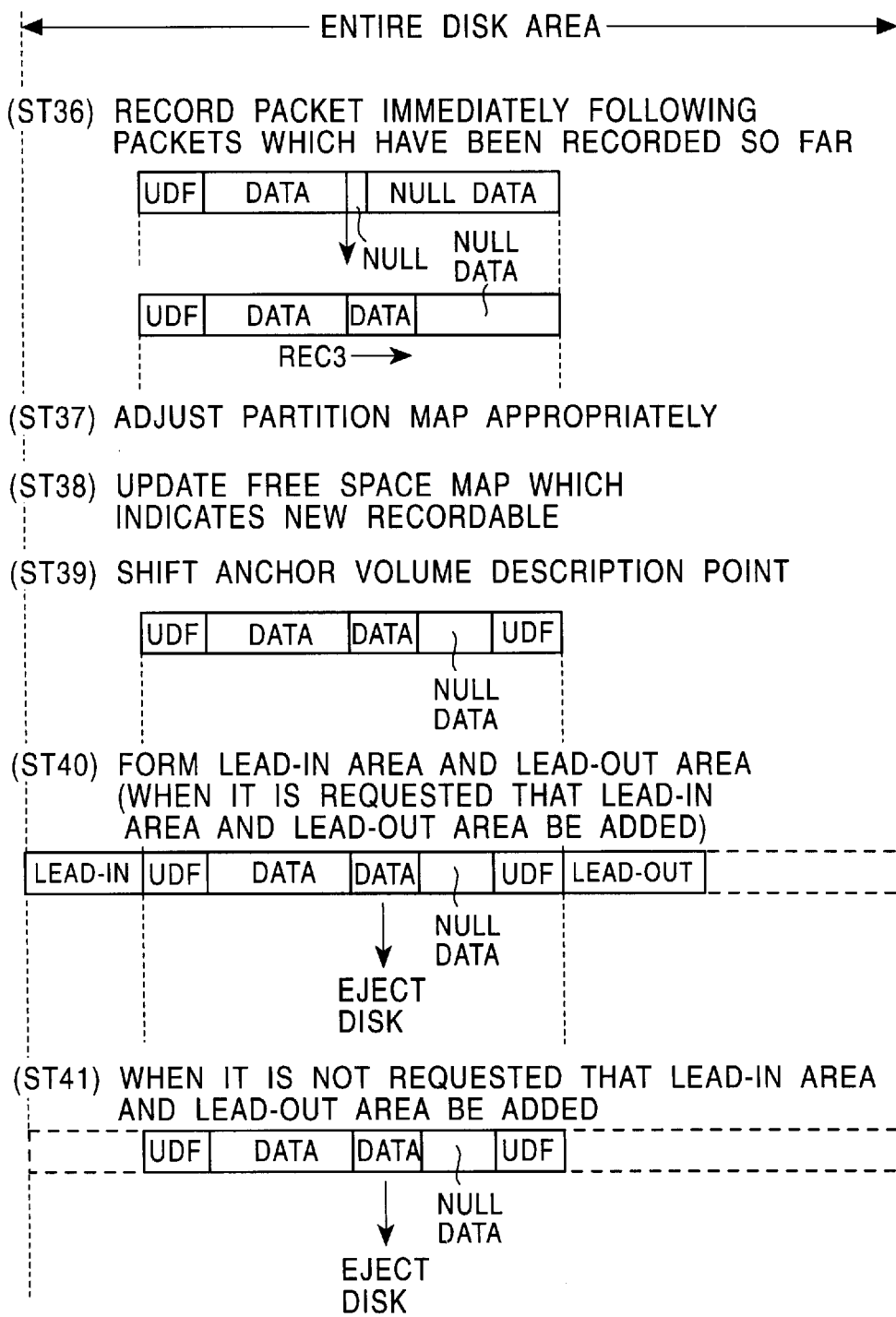
FIG. 22 is a view showing the fast-formatting process according to the embodiment.

The entire disk area shown in FIG. 21 and FIG. 22 indicates a recordable range on a disk, including a lead-in area, a program area, and a lead-out area, in the same way as shown in FIG. 1 to FIG. 3, and excludes the areas for the PCA and the PMA.

In step S31, a part of the program area is formatted by the fixed-length packet method. Specifically, null data (=0) is written into a locally specified area only in the program area. This area to be formatted is called a "local area," for simplicity of description.

The local area does not include the lead-in area or the lead-out area.

In the next step ST32, a UDF file system is recorded.

Then, in step ST33, verification is achieved in the local area, and a sparing table is updated according to the result of the verification.

The local area has been formatted by the above processes. In other words, data can now be recorded into the local area.

It is obvious that the processing time of local-area formatting is shorter than that of the full-formatting process, in which the entire disk area is formatted.

Since a lead-in area or a lead-out area is not recorded, the processing time is further reduced.

The local-area formatting process formats only a partial area in the same way as in the UDF-grow-formatting process. Whereas the UDF-grow-formatting process formats an area which includes a lead-in area and a lead-out area, the local-area formatting process applies a partial formatting to an area which does not include a lead-in area or a lead-out area, which means faster (higher-speed) formatting.

A case in which new data which has a larger amount than the program area formatted partially as a local area is added will be described. In other words, a case in which a formatted area needs to be extended will be described.

As shown in step ST34, data is first recorded in the formatted area as indicated by an arrow Rec1 according to a recording request, and then, another data is recorded as indicated by an arrow Rec2 according to another recording request.

When a writing request further occurs, an attempt is made to execute writing as indicated by an arrow Rec3 according to the request, and it is found that the remaining program area is insufficient.

In such a case, extended formatting is executed.

More specifically, extended formatting starts; null data is overwritten in the UDF; and null data is further written until a required amount of area is obtained, as indicated by an additionally formatted area.

Verification is achieved for the extended area, and the sparing table is updated according to the result of the verification, in step ST35.

Since data can be recorded at this point of time, data is recorded as indicated by the arrow Rec3 from the data packet immediately following the data packets which have been recorded so far.

Then, a partition map is appropriately adjusted in step ST37. A free-space map which indicates a new recordable area is updated in step ST38. An anchor volume description point is shifted according to the extension in step ST39.

Extended formatting achieved in response to the data recording request has been finished.

Extended formatting from step ST34 to step ST39 is executed every time the amount of a recording area is insufficient, as described in step ST34, and the program area is extended gradually. The program area can be extended until the entire disk area has only portions for a lead-in area and a lead-out area except the program area.

In extended formatting, any size (amount) can be specified for an extended program area. In step ST34 to step ST39 shown in FIG. 21 and FIG. 22, the area is additionally formatted such that data to be additionally recorded can be sufficiently placed and the period of time required for extended formatting is not long. The difference between the amount of data to be recorded and that of the remaining formatted program area, in other words, the minimum amount of area required for recording the data, may be extended. In this case, the shortest time is used for required extended formatting.

A case when the user issues a disk-ejection request will be described next.

Before ejecting the disk, the host computer 80 (or the application software) asks the user if the user wants to read data from the disk by using other apparatuses (read-only apparatuses).

When the user shows his or her desire (additional request) to read data recorded into the disk by using other read-only apparatuses, the host computer 80 (or the application software) requests the drive apparatus to add a lead-in area and a lead-out area.

When the system controller 10 of the drive apparatus receives an instruction showing the request, the system controller 10 forms a lead-in area and a lead-out area.

Step ST40 shows the above-described operation.

The lead-in area may be recorded first, or the lead-out area may be first recorded.

When the lead-in area and the lead-out area are formed in step ST40, the system controller 10 responds to the disk ejection request. Specifically, the system controller 10 ejects the disk 90.

When the user does not request the addition of a lead-in area and a lead-out area at the disk ejection request, the system controller 10 ejects the disk 90 from the drive apparatus, as shown in step ST41, according to the disk ejection request with the disk state indicated in step ST39 being unchanged.

In the present embodiment, a lead-in area and a lead-out area are formed as required according to the user's desire.

As described above, disk drive apparatuses which can record data into CD-RWs can read the information of the wobbled groove and therefore can read recorded data according to the information. Consequently, if reading compatibility with other units does not need to be considered, it is unnecessary to form a lead-in area and a lead-out area.

Some read-only apparatuses do not have a wobbling-information reading function since they usually do not need to read the wobbling information. When data needs to be read by such read-only apparatuses, a lead-in area and a lead-out area are required.

Therefore, in the present embodiment, whether a lead-in area and a lead-out area are formed is determined by the user's desire.

If the areas are not formed, the process is shortened by the time required for forming them.

When the program area is extended by fast formatting of the present embodiment in a disk 90 in which a lead-out area has been formed, the lead-out area is first deleted, and the local area, which has been formatted, is extended until a recordable area satisfies the recording request.

With this operation, extended formatting in fast formatting can be achieved even for disks in which a lead-in area and a lead-out area have been formed.

3-2. Formatting start process

Processing executed between the host computer 80 and the disk drive apparatus of the present embodiment, which can execute the above-described fast-formatting process, will be described next by referring to FIG. 23, FIG. 24, and FIG. 25.

Figure 23:
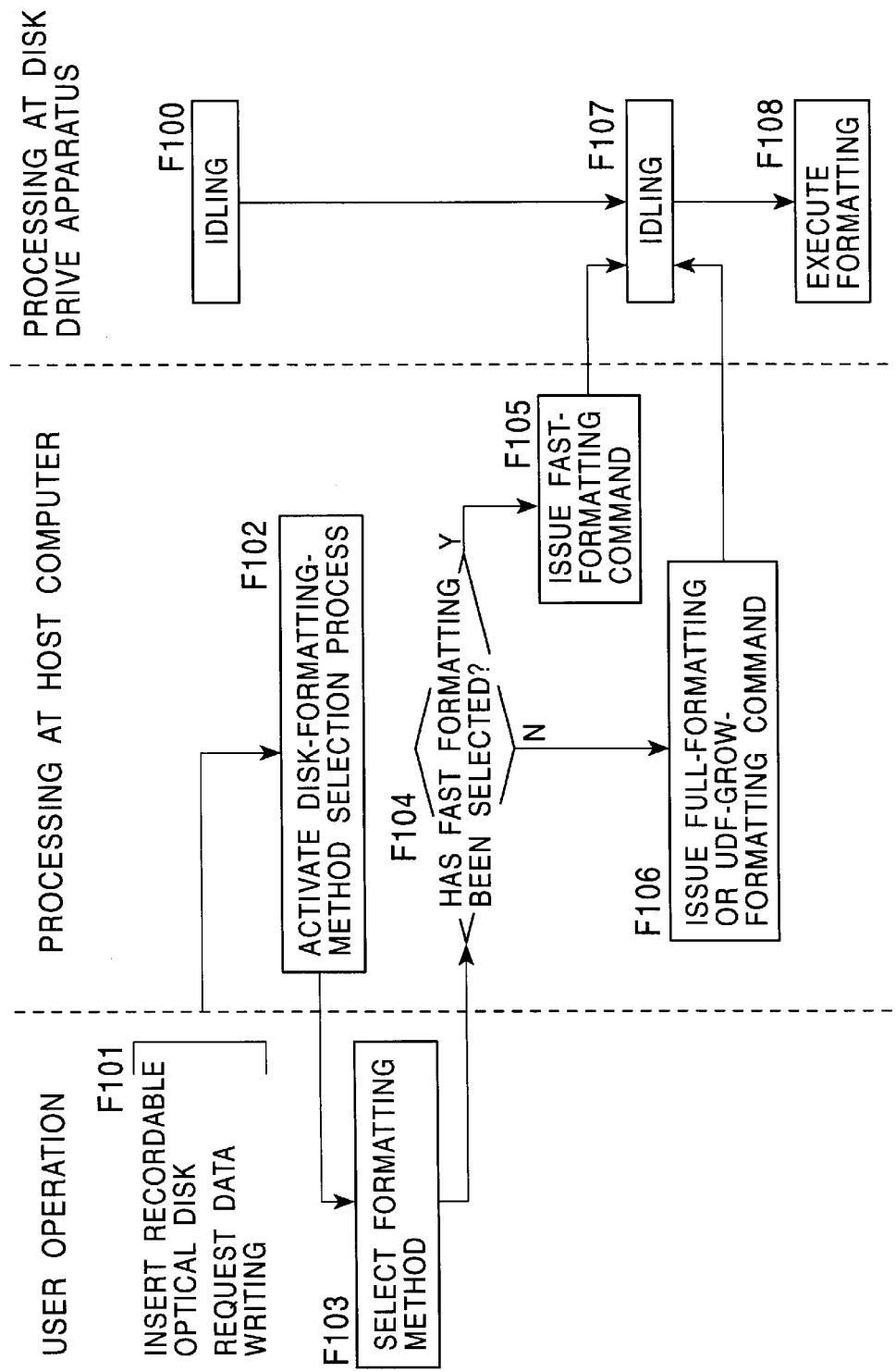
FIG. 23 is a flowchart of a formatting start process according to the embodiment.

FIG. 23 shows a process achieved until formatting is executed.

In step F101, when the user inserts the rewritable disk 90 into the drive apparatus and it is checked by any method that the user wants to write data, the host computer 80 determines that formatting is required for the disk 90, and activates a graphical user interface (GUI) for asking the user to select a formatting method to be applied to the disk 90 (in step F102).

With the GUI, the user is reported on a display of the host computer 80 or by any means that formatting is necessary for the disk 90.

The user selects a formatting method to be applied to the disk 90 (in step F103).

In the present embodiment, not only the fast-formatting process but also the full-formatting process or the UDF-grow-formatting process can be selected as a formatting method. Any of the formatting processes can be used according to the user's desire.

The information of the formatting method selected by the user when the user operates an input apparatus, such as a mouse or a keyboard, is sent to the host computer 80.

The host computer 80 determines whether the method selected by the user is the fast-formatting process, and specifies a command to be issued to the drive apparatus (in step F104).

When the fast-formatting process is selected, the host computer issues a fast-formatting command to the drive apparatus (in step F105). When the full-formatting process or the UDF-grow-formatting process, not the fast-formatting process, is selected, the host computer issues the corresponding formatting command to the drive apparatus (in step F106).

The drive apparatus is idling (from step F101 to F107) after the disk 90 is inserted. When the drive apparatus receives a formatting command from the host computer 80, the drive apparatus changes its state to that for executing formatting (in step F108).

In other words, according to the command, the drive apparatus enters a state in which fast formatting or full formatting (or UDF-grow formatting) is achieved.

3-3. Fast-formatting process

Formatting starts as shown in FIG. 23. When the command issued by the host computer 80 specifies fast formatting, the drive apparatus executes fast formatting.

Figure 24:
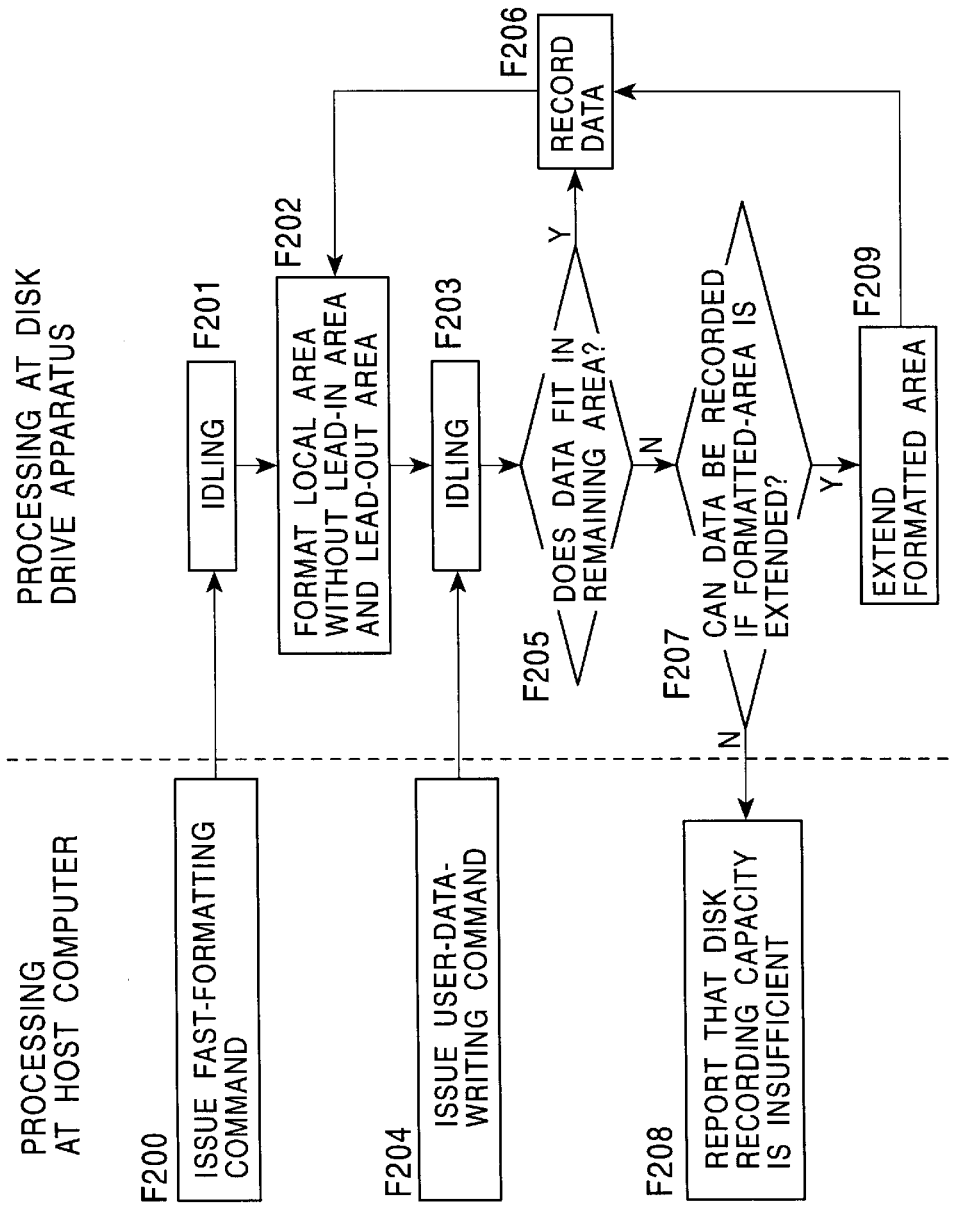
FIG. 24 is a flowchart of the fast-formatting process according to the embodiment.

FIG. 24 shows the fast-formatting process.

When the system controller 10 of the drive apparatus which is idling (in step F201) receives a fast-formatting command (in step F200) from the host computer 80, it starts the fast-formatting process.

In step F202, the system controller 10 formats a limited program area without adding a lead-in area and a lead-out area, namely, the local area shown in FIG. 21. This operation corresponds to step ST31 to step ST33 shown in FIG. 21.

When the local area has been formatted, the system controller 10 again enters an idling state (in step F203).

In this state, the system controller 10 is ready to receive a new command from the host computer 80.

When the host computer 80 issues a new data writing command in step F204, the system controller 10 determines whether data to be recorded fits in the remaining formatted area (in step F205).

When it is determined that the new data can be recorded in the formatted area, the system controller soon executes a data recording process in step F206, and then enters a state in which the system controller 10 can receive a host command issued next, namely, an idling state (step F206 to step F203).

When it is determined in step F205 that the new data does not fit in the remaining formatted area after the writing command has been issued, the system controller 10 regards the command as that for writing data beyond the capacity of the formatted program area, and proceeds to step F207.

It is determined in this step how far the formatted area is extended, in order to make a new formatted area.

It is first determined whether data writing caused by the current writing command exceeds the maximum recordable capacity of the disk 90. If it exceeds, the request sent from the host computer 80 physically cannot be satisfied, it is reported to the host computer that the disk recording capacity is insufficient (in step F208). In this case, the host computer 80 issues an error message to the user to stop recording.

When it is determined in step F207 that data writing does not exceed the recording capacity of the disk 90, the formatted area is extended so as to have an area enough for recording the new data or more in step F209.

The program area is extended as shown in step ST34 to step ST35 in FIG. 21.

When the formatted area has been extended, the new data is recorded into the optical disk in step F206, as requested by the host computer 80.

This operation corresponds to step ST36 to step ST39 shown in FIG. 22.

A series of processes in which extended formatting is executed, if necessary, and data is recorded according to a recording request continues until the formatted area reaches the maximum program area.

Extended formatting can be applied to any area ranging from the area required for recording the new data to the maximum area (depending on the formatting process speed of the drive apparatus) which can be formed within a tolerable period of time during which the user can wait for the formatting process to complete. In the formatting process of the drive apparatus, null data or any data is recorded.

3-4. Ejection process

A process for ejecting the disk 90 will be described next by referring to FIG. 25.

When data is recorded as shown in FIG. 24 while fast formatting is achieved, a lead-in area or a lead-out area is not formed. When data is to be read from such a disk 90 by using a read-only apparatus, it is required that a lead-in area and a lead-out area be recorded at ejection. In other words, if reading compatibility with read-only apparatuses does not need to be considered, a lead-in area or a lead-out area does not need to be recorded.

Under such conditions, the process shown in FIG. 25 is performed.

When the user achieves an operation for taking out the disk 90 (in step F300), the host computer 80 detects by some means a state in which the user attempts to take out the disk 90, and activates a disk ejection process (in step F301). Then, the host computer 80 activates a GUI for asking the user whether a lead-in area and a lead-out area are recorded (in step F302) when the disk 90 is taken out, in order to obtain compatibility with read-only apparatuses.

The user determines on a selection screen shown on the display (in step F303) whether it is necessary to obtain compatibility with read-only apparatuses.

The host computer 80 checks the user's desire (in step F304) for whether it is required that compatibility with read-only apparatuses be obtained. If compatibility is not required, the host computer issues an ejection request of the disk 90 to the drive apparatus (in step F305).

The system controller 10 of the drive apparatus executes an ejection process (in step F306) for the disk 90 according to the request (command) from the host computer 80. In other words, the disk 90 is ejected without forming a lead-in area and a lead-out area.

When it is checked that the user wants to ensure compatibility with read-only apparatuses, the host computer 80 issues a command to the drive apparatus so as to record a lead-in area and a lead-out area (in step F307).

The system controller 10 of the drive apparatus receives the command for recording a lead-in area and a lead-out area, and records the lead-in area and the lead-out area (in step F308).

When the host computer 80 determines that the drive apparatus finishes the execution of the command, namely, when the lead-in area and the lead-out area have been recorded and the drive apparatus enters an idling state, the host computer 80 issues an ejection command to the drive apparatus (in step F309) in order to satisfy the user's disk ejection request.

The system controller 10 of the drive apparatus achieves a disk ejection process according to the command (in step F310).

In this case, since the lead-in area and the lead-out area have been formed, data can be read from the disk 90 even by using read-only apparatuses.

4. Modified embodiments

An embodiment of the present invention has been described. Various modified embodiments can be considered in the following way.

It is effective that the drive apparatus changes the size of the program-area recording range, namely, the size of the local area, on a disk according to a specified speed or the current specified formatting speed in fast formatting of the present invention.

It is desired that as a wide area as possible be formatted within a short period of time. Conversely, to shorten the waiting time of the user, it is necessary to narrow an area to be formatted. Therefore, it is effective that the size of the local area is specified according to the formatting speed.

The recording capacity of CD-RWs is indicated by time from a historical reason. Data of 74 minutes can be recorded where one minute corresponds to 9 MB. It takes about 40 minutes to record the data including TOC and other data even at a doubled speed.

When formatting is applied to an area corresponding to data of 9 MB at a double-speed writing condition in the drive apparatus, it may be configured such that formatting is applied to an area corresponding to data of 18 MB at a quadruple-speed writing condition, and formatting is applied to an area corresponding to data of 36 MB at a eight-times-faster writing condition.

In any condition, a formatting time is one minute from the user's viewpoint.

One minute is taken as an example here. The time can have any value. It is preferred that as a large area as possible be formatted within a period of time which the user does not feel inconvenient.

Null data or any data may be overwritten when a lead-in area and a lead-out area are re-recorded. Alternatively, the lead-in area and the lead-out area may be re-recorded such that recorded data is first deleted and then null data or any data is overwritten.

In the same way, a formatted area may be extended over the lead-out area which has been formed, such that the lead-out area is deleted and then the area is formatted, or the lead-out area is directly formatted.

It is understood from the foregoing descriptions that the following advantages are obtained according to the present invention.

Formatting is applied only to a local area which is a part of the entire recordable area of a rewritable disk and which does not include portions where a lead-in area and a lead-out area are to be formed. In other words, only the required minimum program area is formatted, and a lead-in area or a lead-out area is not formed. Therefore, formatting is finished quickly. Formatting of the present invention is faster than conventional formatting processes, such as the full-formatting process and the UDF-grow-formatting process, and reduces the waiting time of the user.

Since formatting is applied to the local area having the size corresponding to the amount of data to be recorded, the local area to be formatted has the most appropriate size in terms of the amount of data to be recorded and the formatting time.

The size of the local area to be formatted is specified when formatting is executed, according to a recording speed specified by the disk drive apparatus. In other words, formatting is executed at an appropriate size, with a desire in which as a large area as possible is formatted according to a formatting ability (speed) and a desire in which the formatting time is reduced as much as possible being considered.

Since extended formatting is achieved if a formatted local area is insufficient for recording data, gradual formatting is performed as required and it is appropriate for a recording operation. In addition, since a lead-in area or a lead-out area is not processed, formatting is quickly achieved.

A lead-in area and a lead-out area are formed when it is required in an input instruction and when a rewritable disk is ejected. When the user thinks that a lead-in area and a lead-out area are unnecessary, for example, a wasteful writing time can be omitted. When the user thinks that compatibility with other read-only apparatuses should be obtained, a lead-in area and a lead-out area are formed.

When extended formatting is to be achieved in a case in which a lead-out area has been formed in a rewritable disk, the lead-out area is deleted and the formatted local area is extended so as to satisfy a recording request. Therefore, extended formatting can be applied even to disks in which a lead-in area and a lead-out area have been formed.

A formatting process only for a local area and a formatting process for the entire recordable area can be selectively achieved. Therefore, formatting is flexible for the condition of the user.

What is claimed is:

1. A disk drive apparatus for recording data into a rewritable disk by a fixed-length packet-write method and for reading recorded data, comprising:

a format controller for applying a formatting process only to a local area which is a part of the entire recordable area of the rewritable disk and which does not include portions where a lead-in area and a lead-out area are to be formed; and a recording controller for executing and controlling a data recording operation at an area formatted by the format controller wherein the format controller sets the size of the local area to be formatted, according to a recording speed specified when formatting is executed.

2. The disk drive apparatus according to claim 1, wherein the format controller sets the size of the local area to be formatted, according to the amount of data to be recorded.

3. The disk drive apparatus according to claim 1, wherein the rewritable disk is a phase-change-type optical disk.

4. The disk drive apparatus according to claim 1, wherein, when a recording request which needs a recording capacity more than that of the local area formatted by the format controller is made, the format controller achieves an extended-formatting process for extending the formatted local area, so that the recording request is satisfied, and the recording controller executes and controls a recording operation according to the recording request for the local area extended by the extended-formatting process.

5. The disk drive apparatus according to claim 1, wherein the recording controller executes and controls a process for forming a lead-in area and a lead-out area before and after the local area when the rewritable disk is ejected.

6. The disk drive apparatus according to claim 5, wherein the recording controller specifies whether the process for forming a lead-in area and a lead-out area is executed, according to an instruction sent from the host computer.

7. The disk drive apparatus according to claim 1, wherein, if an additional recording request which needs a recording capacity more than that of the local area is made when a lead-out area has been formed in the rewritable disk, the format controller deletes the lead-out area and achieves an extended-formatting process for extending the formatted local area, so that the recording request is satisfied, and the recording controller executes and controls a recording operation according to the recording request for the local area extended by the extended-formatting process.

8. The disk drive apparatus according to claim 1, wherein the format controller selectively applies a formatting process only to the local area or to the entire recording area according to an input instruction.

9. The disk drive apparatus according to claim 1, wherein the format controller performs the formatting process by recording null data into the local area.

10. The disk drive apparatus according to claim 1, further comprising an optical pickup for recording data.

11. A disk formatting method for a rewritable disk in which data is recorded by a fixed-length packet-write method, comprising the step of:

applying a formatting process only to a local area which is a part of the entire recordable area of the rewritable disk and which does not include portions where a lead-in area and a lead-out area are to be formed wherein in the formatting process, the size of the local area to be formatted is set according to a recording speed specified when formatting is executed.

12. The disk formatting method according to claim 11, wherein the size of the local area to be formatted is set according to the amount of data to be recorded, in the formatting process.

13. The disk formatting method according to claim 11, wherein, when a recording request which needs a recording capacity more than that of the formatted local area is made, an extended-formatting process for extending the formatted local area is achieved so that the recording request is satisfied.

14. The disk formatting method according to claim 11, wherein, when a request for ejecting the rewritable disk is made, whether a process for forming a lead-in area and a lead-out area before and after the local area is executed is specified according to an input instruction.

15. The disk formatting method according to claim 11, wherein, if an additional recording request which needs a recording capacity more than that of the local area is made when a lead-out area has been formed in the rewritable disk, the lead-out area is deleted and an extended-formatting process for extending the formatted local area is achieved so that the recording request is satisfied.

16. The disk formatting method according to claim 11, wherein a formatting process is selectively applied only to the local area or to the entire recording area according to an input instruction.

17. A disk drive apparatus for recording data into a rewritable, optical disk and for reading recorded data, comprising:

an optical pickup for emitting laser light in order to record data into the rewritable, optical disk and to read recorded data;

a format controller for applying a formatting process by the optical pickup only to a local area which is a part of the entire recordable area of the rewritable, optical disk and which does not include portions where a lead-in area and a lead-out area are to be formed; and a recording controller for executing and controlling a data recording operation at an area formatted by the format controller wherein the format controller sets the size of the local area to be formatted, according to a recording speed specified when formatting is executed.

18. The disk drive apparatus according to claim 17, wherein the format controller sets the size of the local area to be formatted, according to the amount of data to be recorded.

19. The disk drive apparatus according to claim 17, wherein, when a recording request which needs a recording capacity more than that of the local area formatted by the format controller is made, the format controller achieves an extended-formatting process for extending the formatted local area, so that the recording request is satisfied, and the recording controller executes and controls a recording operation according to the recording request for the local area extended by the extended-formatting process.

20. The disk drive apparatus according to claim 17, wherein the recording controller executes and controls a process for forming a lead-in area and a lead-out area before and after the local area when the rewritable, optical disk is ejected.

21. The disk drive apparatus according to claim 20, wherein the recording controller specifies whether the process for forming a lead-in area and a lead-out area is executed, according to an instruction sent from the host computer.

22. The disk drive apparatus according to claim 17, wherein, if an additional recording request which needs a recording capacity more than that of the local area is made when a lead-out area has been formed in the rewritable, optical disk, the format controller deletes the lead-out area and achieves an extended-formatting process for extending the formatted local area, so that the recording request is satisfied, and the recording controller executes and controls a recording operation according to the recording request for the local area extended by the extended-formatting process.

23. The disk drive apparatus according to claim 17, wherein the format controller selectively applies a formatting process only to the local area or to the entire recording area according to an input instruction.

24. The disk drive apparatus according to claim 17, wherein the format controller performs the formatting process by recording null data into the local area.

25. The disk drive apparatus according to claim 17, wherein data is recorded into the rewritable, optical disk by a fixed-length packet-write method.

\* \* \* \* \*

UNITED STATES PATENT AND TRADEMARK OFFICE
CERTIFICATE OF CORRECTION

PATENT NO. : 6,785,213 B2
DATED : August 31, 2004
INVENTOR(S) : Yukio Shishido et al.

It is certified that error appears in the above-identified patent and that said Letters Patent is hereby corrected as shown below:

Column 12,
Line 38, please change "10000000000010000000000010" to --10000000000100000000000010--.

Signed and Sealed this

Fifteenth Day of March, 2005

JON W. DUDAS
*Director of the United States Patent and Trademark Office*